(12) United States Patent
Nerurkar

(10) Patent No.: US 8,959,093 B1
(45) Date of Patent: Feb. 17, 2015

(54) RANKING SEARCH RESULTS BASED ON ANCHORS

(75) Inventor: Ajay P. Nerurkar, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 232 days.

(21) Appl. No.: 12/723,973

(22) Filed: Mar. 15, 2010

(51) Int. Cl.
G06F 7/00 (2006.01)
G06F 17/30 (2006.01)

(52) U.S. Cl.
USPC ........... 707/751; 707/706; 707/721; 707/722; 707/723; 707/726; 707/728; 707/748; 707/749

(58) Field of Classification Search
USPC ........................................................ 707/728
See application file for complete search history.

(56) References Cited

U.S. PATENT DOCUMENTS

| | | | |
|---|---|---|---|
| 5,265,065 | A | 11/1993 | Turtle |
| 5,488,725 | A | 1/1996 | Turtle |
| 5,696,962 | A | 12/1997 | Kupiec |
| 5,920,854 | A | 7/1999 | Kirsch et al. |
| 5,963,940 | A | 10/1999 | Liddy et al. |
| 6,006,222 | A | 12/1999 | Culliss |
| 6,006,225 | A | 12/1999 | Bowman et al. |
| 6,014,665 | A | 1/2000 | Culliss |
| 6,026,388 | A | 2/2000 | Liddy et al. |
| 6,067,565 | A | 5/2000 | Horvitz |
| 6,078,916 | A | 6/2000 | Culliss |
| 6,078,917 | A | 6/2000 | Paulsen et al. |
| 6,088,692 | A | 7/2000 | Driscoll |
| 6,134,532 | A | 10/2000 | Lazarus et al. |
| 6,182,066 | B1 | 1/2001 | Marques |
| 6,182,068 | B1 | 1/2001 | Culliss |
| 6,185,559 | B1 | 2/2001 | Brin et al. |
| 6,249,252 | B1 | 6/2001 | Dupray |
| 6,285,999 | B1 | 9/2001 | Page |

(Continued)

FOREIGN PATENT DOCUMENTS

| | | |
|---|---|---|
| WO | WO 00/77689 | 12/2000 |
| WO | WO 01/16807 | 3/2001 |

(Continued)

OTHER PUBLICATIONS

Agichtein, et al; *Improving Web Search Ranking by Incorporating User Behavior Information*; Aug. 2006; Proceedings of the Twenty-Ninth Annual International ACM SIGIR Conference on Research and Development in Information Retrieval, p. 19-26.

(Continued)

*Primary Examiner* — Ajay Bhatia
*Assistant Examiner* — Cheryl M Shechtman
(74) *Attorney, Agent, or Firm* — Fish & Richardson P.C.

(57) ABSTRACT

In general, one aspect described can be embodied in a method for providing input to a document ranking process for ranking a plurality of documents, the document ranking process taking as input a quality of result statistic for a query and an individual document. The method can include, for a first document identified as a search result of a query, receiving information regarding an anchor contained within the first document, where the anchor provides a link to a second document; deriving a quality of result statistic for the second document from at least a portion of first data associated with the first document and the query, the first data being indicative of user behavior relative to the first document as a search result for the query; and providing the first quality of result statistic as input to the document ranking process for the second document and the query.

20 Claims, 10 Drawing Sheets

(56) References Cited

U.S. PATENT DOCUMENTS

| | | | |
|---|---|---|---|
| 6,321,228 B1 | 11/2001 | Crandall et al. | |
| 6,327,590 B1 | 12/2001 | Chidlovskii et al. | |
| 6,341,283 B1 | 1/2002 | Yamakawa et al. | |
| 6,353,849 B1 | 3/2002 | Linsk | |
| 6,363,378 B1 | 3/2002 | Conklin et al. | |
| 6,370,526 B1 | 4/2002 | Agrawal et al. | |
| 6,421,675 B1 * | 7/2002 | Ryan et al. | 707/100 |
| 6,473,752 B1 | 10/2002 | Fleming, III | |
| 6,480,843 B2 | 11/2002 | Li | |
| 6,490,575 B1 | 12/2002 | Berstis | |
| 6,526,440 B1 | 2/2003 | Bharat | |
| 6,529,903 B2 | 3/2003 | Smith et al. | |
| 6,539,377 B1 | 3/2003 | Culliss | |
| 6,560,590 B1 | 5/2003 | Shwe et al. | |
| 6,567,103 B1 | 5/2003 | Chaudhry | |
| 6,587,848 B1 | 7/2003 | Aggarwal et al. | |
| 6,615,209 B1 | 9/2003 | Gomes | |
| 6,623,529 B1 | 9/2003 | Lakritz | |
| 6,640,218 B1 | 10/2003 | Golding et al. | |
| 6,658,423 B1 | 12/2003 | Pugh et al. | |
| 6,671,681 B1 | 12/2003 | Emens et al. | |
| 6,678,681 B1 | 1/2004 | Brin et al. | |
| 6,701,309 B1 | 3/2004 | Beeferman et al. | |
| 6,725,259 B1 | 4/2004 | Bharat | |
| 6,738,764 B2 | 5/2004 | Mao et al. | |
| 6,754,873 B1 | 6/2004 | Law et al. | |
| 6,792,416 B2 | 9/2004 | Soetarman et al. | |
| 6,795,820 B2 | 9/2004 | Barnett | |
| 6,816,850 B2 | 11/2004 | Culliss | |
| 6,853,993 B2 | 2/2005 | Ortega et al. | |
| 6,873,982 B1 | 3/2005 | Bates et al. | |
| 6,877,002 B2 | 4/2005 | Prince | |
| 6,882,999 B2 | 4/2005 | Cohen et al. | |
| 6,901,402 B1 | 5/2005 | Corston-Oliver et al. | |
| 6,912,505 B2 | 6/2005 | Linden et al. | |
| 6,944,611 B2 | 9/2005 | Flank et al. | |
| 6,944,612 B2 | 9/2005 | Roustant et al. | |
| 6,954,750 B2 | 10/2005 | Bradford | |
| 6,963,867 B2 | 11/2005 | Ford et al. | |
| 6,990,453 B2 | 1/2006 | Wang et al. | |
| 7,016,939 B1 | 3/2006 | Rothwell et al. | |
| 7,028,027 B1 | 4/2006 | Zha et al. | |
| 7,072,886 B2 | 7/2006 | Salmenkaita et al. | |
| 7,085,761 B2 | 8/2006 | Shibata | |
| 7,113,939 B2 | 9/2006 | Chou et al. | |
| 7,117,206 B1 | 10/2006 | Bharat et al. | |
| 7,136,849 B2 * | 11/2006 | Patrick | 715/205 |
| 7,146,361 B2 | 12/2006 | Broder et al. | |
| 7,222,127 B1 | 5/2007 | Bem et al. | |
| 7,231,399 B1 | 6/2007 | Bem et al. | |
| 7,243,102 B1 | 7/2007 | Naam et al. | |
| 7,249,126 B1 | 7/2007 | Ginsburg et al. | |
| 7,266,765 B2 * | 9/2007 | Golovchinsky et al. | 715/205 |
| 7,293,016 B1 | 11/2007 | Shakib et al. | |
| 7,379,951 B2 | 5/2008 | Chkodrov et al. | |
| 7,382,358 B2 | 6/2008 | Kushler et al. | |
| 7,395,222 B1 | 7/2008 | Sotos | |
| 7,426,507 B1 * | 9/2008 | Patterson | 707/3 |
| 7,451,487 B2 | 11/2008 | Oliver et al. | |
| 7,516,146 B2 | 4/2009 | Robertson et al. | |
| 7,526,470 B1 | 4/2009 | Karnawat et al. | |
| 7,533,092 B2 | 5/2009 | Berkhin et al. | |
| 7,533,130 B2 | 5/2009 | Narayana et al. | |
| 7,552,112 B2 | 6/2009 | Jhala et al. | |
| 7,565,363 B2 | 7/2009 | Anwar | |
| 7,565,367 B2 | 7/2009 | Barrett et al. | |
| 7,566,363 B2 | 7/2009 | Starling et al. | |
| 7,574,530 B2 | 8/2009 | Wang et al. | |
| 7,584,181 B2 | 9/2009 | Zeng et al. | |
| 7,610,282 B1 | 10/2009 | Datar et al. | |
| 7,636,714 B1 | 12/2009 | Lamping et al. | |
| 7,657,626 B1 | 2/2010 | Zwicky | |
| 7,680,775 B2 | 3/2010 | Levin et al. | |
| 7,693,818 B2 * | 4/2010 | Majumder | 707/999.002 |
| 7,716,225 B1 | 5/2010 | Dean et al. | |
| 7,747,612 B2 | 6/2010 | Thun et al. | |
| 7,756,887 B1 | 7/2010 | Haveliwala | |
| 7,783,632 B2 | 8/2010 | Richardson et al. | |
| 7,801,885 B1 | 9/2010 | Verma | |
| 7,809,716 B2 | 10/2010 | Wang et al. | |
| 7,818,315 B2 | 10/2010 | Cucerzan et al. | |
| 7,818,320 B2 | 10/2010 | Makeev | |
| 7,836,058 B2 | 11/2010 | Chellapilla et al. | |
| 7,844,589 B2 | 11/2010 | Wang et al. | |
| 7,849,089 B2 | 12/2010 | Zhang et al. | |
| 7,853,557 B2 | 12/2010 | Schneider et al. | |
| 7,877,404 B2 | 1/2011 | Achan et al. | |
| 7,895,177 B2 | 2/2011 | Wu | |
| 7,925,498 B1 | 4/2011 | Baker et al. | |
| 7,953,740 B1 | 5/2011 | Vadon et al. | |
| 7,974,974 B2 | 7/2011 | Tankovich et al. | |
| 7,987,185 B1 | 7/2011 | Mysen et al. | |
| 8,001,136 B1 | 8/2011 | Papachristou et al. | |
| 8,019,650 B2 | 9/2011 | Donsbach et al. | |
| 8,024,326 B2 | 9/2011 | Tong et al. | |
| 8,024,330 B1 | 9/2011 | Franco et al. | |
| 8,027,439 B2 | 9/2011 | Zoldi et al. | |
| 8,037,042 B2 | 10/2011 | Anderson et al. | |
| 8,051,061 B2 | 11/2011 | Niu et al. | |
| 8,060,456 B2 | 11/2011 | Gao et al. | |
| 8,060,497 B1 | 11/2011 | Zatsman et al. | |
| 8,065,296 B1 | 11/2011 | Franz et al. | |
| 8,069,182 B2 | 11/2011 | Pieper | |
| 8,073,263 B2 | 12/2011 | Hull et al. | |
| 8,073,772 B2 | 12/2011 | Bishop et al. | |
| 8,073,867 B2 | 12/2011 | Chowdhury | |
| 8,086,599 B1 | 12/2011 | Heymans | |
| 8,090,717 B1 | 1/2012 | Bharat et al. | |
| 8,156,111 B2 | 4/2012 | Jones et al. | |
| 8,224,827 B2 | 7/2012 | Dean et al. | |
| 8,239,370 B2 * | 8/2012 | Wong et al. | 707/713 |
| 8,412,699 B1 | 4/2013 | Mukherjee et al. | |
| 8,458,165 B2 | 6/2013 | Liao et al. | |
| 8,498,974 B1 | 7/2013 | Kim et al. | |
| 8,521,725 B1 | 8/2013 | Pearson et al. | |
| 8,583,636 B1 | 11/2013 | Franz et al. | |
| 2001/0000356 A1 | 4/2001 | Woods | |
| 2002/0034292 A1 | 3/2002 | Tuoriniemi et al. | |
| 2002/0042791 A1 | 4/2002 | Smith et al. | |
| 2002/0049752 A1 | 4/2002 | Bowman et al. | |
| 2002/0103790 A1 | 8/2002 | Wang et al. | |
| 2002/0123988 A1 | 9/2002 | Dean et al. | |
| 2002/0133481 A1 | 9/2002 | Smith et al. | |
| 2002/0165849 A1 | 11/2002 | Singh et al. | |
| 2003/0009399 A1 | 1/2003 | Boerner | |
| 2003/0018707 A1 | 1/2003 | Flocken | |
| 2003/0028529 A1 | 2/2003 | Cheung et al. | |
| 2003/0037074 A1 | 2/2003 | Dwork et al. | |
| 2003/0078914 A1 | 4/2003 | Witbrock | |
| 2003/0120654 A1 | 6/2003 | Edlund et al. | |
| 2003/0135490 A1 | 7/2003 | Barrett et al. | |
| 2003/0149704 A1 | 8/2003 | Yayoi et al. | |
| 2003/0167252 A1 | 9/2003 | Odom et al. | |
| 2003/0195877 A1 | 10/2003 | Ford et al. | |
| 2003/0204495 A1 | 10/2003 | Lehnert | |
| 2003/0220913 A1 | 11/2003 | Doganata et al. | |
| 2003/0229640 A1 | 12/2003 | Carlson et al. | |
| 2004/0006456 A1 | 1/2004 | Loofbourrow | |
| 2004/0006740 A1 | 1/2004 | Krohn et al. | |
| 2004/0034632 A1 | 2/2004 | Carmel et al. | |
| 2004/0049486 A1 | 3/2004 | Scanlon et al. | |
| 2004/0059708 A1 | 3/2004 | Dean et al. | |
| 2004/0083205 A1 | 4/2004 | Yeager | |
| 2004/0093325 A1 | 5/2004 | Banerjee et al. | |
| 2004/0119740 A1 | 6/2004 | Chang et al. | |
| 2004/0122811 A1 | 6/2004 | Page | |
| 2004/0153472 A1 | 8/2004 | Rieffanaugh, Jr. | |
| 2004/0158560 A1 | 8/2004 | Wen et al. | |
| 2004/0186828 A1 | 9/2004 | Yadav | |
| 2004/0186996 A1 | 9/2004 | Gibbs et al. | |
| 2004/0199419 A1 | 10/2004 | Kim et al. | |
| 2004/0215607 A1 | 10/2004 | Travis, Jr. | |
| 2005/0015366 A1 | 1/2005 | Carrasco et al. | |
| 2005/0021397 A1 | 1/2005 | Cui et al. | |

(56) References Cited

U.S. PATENT DOCUMENTS

| | | |
|---|---|---|
| 2005/0027691 A1 | 2/2005 | Brin et al. |
| 2005/0033803 A1 | 2/2005 | Vleet et al. |
| 2005/0050014 A1 | 3/2005 | Gosse et al. |
| 2005/0055342 A1 | 3/2005 | Bharat et al. |
| 2005/0055345 A1 | 3/2005 | Ripley |
| 2005/0060290 A1 | 3/2005 | Herscovici et al. |
| 2005/0060310 A1 | 3/2005 | Tong et al. |
| 2005/0060311 A1 | 3/2005 | Tong et al. |
| 2005/0071741 A1 | 3/2005 | Acharya et al. |
| 2005/0102282 A1 | 5/2005 | Linden |
| 2005/0125376 A1 | 6/2005 | Curtis et al. |
| 2005/0160083 A1 | 7/2005 | Robinson |
| 2005/0192946 A1 | 9/2005 | Lu et al. |
| 2005/0198026 A1 | 9/2005 | Dehlinger et al. |
| 2005/0222987 A1 | 10/2005 | Vadon |
| 2005/0222998 A1 | 10/2005 | Driessen et al. |
| 2005/0240576 A1 | 10/2005 | Piscitello et al. |
| 2005/0240580 A1 | 10/2005 | Zamir et al. |
| 2005/0256848 A1 | 11/2005 | Alpert et al. |
| 2006/0047643 A1 | 3/2006 | Chaman |
| 2006/0069667 A1 | 3/2006 | Manasse et al. |
| 2006/0074903 A1 | 4/2006 | Meyerzon et al. |
| 2006/0089926 A1 | 4/2006 | Knepper et al. |
| 2006/0095421 A1 | 5/2006 | Nagai et al. |
| 2006/0106793 A1 | 5/2006 | Liang |
| 2006/0123014 A1 | 6/2006 | Ng |
| 2006/0173830 A1 | 8/2006 | Smyth et al. |
| 2006/0195443 A1 | 8/2006 | Franklin et al. |
| 2006/0200476 A1 | 9/2006 | Gottumukkala et al. |
| 2006/0200556 A1 | 9/2006 | Brave et al. |
| 2006/0227992 A1 | 10/2006 | Rathus et al. |
| 2006/0230040 A1 | 10/2006 | Curtis et al. |
| 2006/0293950 A1 | 12/2006 | Meek et al. |
| 2007/0005575 A1 | 1/2007 | Dai et al. |
| 2007/0005588 A1 | 1/2007 | Zhang et al. |
| 2007/0038659 A1 | 2/2007 | Datar et al. |
| 2007/0050339 A1 | 3/2007 | Kasperski et al. |
| 2007/0061195 A1 | 3/2007 | Liu et al. |
| 2007/0061211 A1 | 3/2007 | Ramer et al. |
| 2007/0081197 A1 | 4/2007 | Omoigui |
| 2007/0106659 A1* | 5/2007 | Lu et al. ............................. 707/5 |
| 2007/0112730 A1 | 5/2007 | Gulli et al. |
| 2007/0130370 A1 | 6/2007 | Akaezuwa |
| 2007/0156677 A1 | 7/2007 | Szabo |
| 2007/0172155 A1 | 7/2007 | Guckenberger |
| 2007/0180355 A1 | 8/2007 | McCall et al. |
| 2007/0192190 A1 | 8/2007 | Granville |
| 2007/0208730 A1 | 9/2007 | Agichtein et al. |
| 2007/0214131 A1 | 9/2007 | Cucerzan et al. |
| 2007/0233653 A1 | 10/2007 | Biggs et al. |
| 2007/0255689 A1 | 11/2007 | Sun et al. |
| 2007/0260596 A1 | 11/2007 | Koran et al. |
| 2007/0260597 A1 | 11/2007 | Cramer et al. |
| 2007/0266021 A1 | 11/2007 | Aravamudan et al. |
| 2007/0266439 A1 | 11/2007 | Kraft |
| 2007/0288450 A1 | 12/2007 | Datta et al. |
| 2008/0010143 A1 | 1/2008 | Kniaz et al. |
| 2008/0027913 A1 | 1/2008 | Chang et al. |
| 2008/0052219 A1 | 2/2008 | Sandholm et al. |
| 2008/0052273 A1 | 2/2008 | Pickens |
| 2008/0059453 A1 | 3/2008 | Laderman |
| 2008/0077570 A1 | 3/2008 | Tang et al. |
| 2008/0082518 A1 | 4/2008 | Loftesness |
| 2008/0091650 A1 | 4/2008 | Fontoura et al. |
| 2008/0104043 A1 | 5/2008 | Garg et al. |
| 2008/0114624 A1 | 5/2008 | Kitts |
| 2008/0114729 A1 | 5/2008 | Raman et al. |
| 2008/0114750 A1 | 5/2008 | Saxena et al. |
| 2008/0140699 A1 | 6/2008 | Jones et al. |
| 2008/0162475 A1 | 7/2008 | Meggs et al. |
| 2008/0183660 A1 | 7/2008 | Szulcewski |
| 2008/0189269 A1 | 8/2008 | Olsen |
| 2008/0228442 A1 | 9/2008 | Lippincott et al. |
| 2008/0256050 A1 | 10/2008 | Zhang et al. |
| 2008/0313168 A1 | 12/2008 | Liu et al. |
| 2008/0313247 A1 | 12/2008 | Galvin |
| 2009/0012969 A1 | 1/2009 | Rail et al. |
| 2009/0055392 A1 | 2/2009 | Gupta et al. |
| 2009/0070194 A1 | 3/2009 | Song |
| 2009/0157643 A1 | 6/2009 | Gollapudi et al. |
| 2009/0182723 A1 | 7/2009 | Shnitko et al. |
| 2009/0228442 A1 | 9/2009 | Adams et al. |
| 2009/0287656 A1 | 11/2009 | Bennett |
| 2010/0106706 A1 | 4/2010 | Rorex et al. |
| 2010/0131563 A1 | 5/2010 | Yin |
| 2010/0205541 A1 | 8/2010 | Rapaport et al. |
| 2010/0228738 A1 | 9/2010 | Mehta et al. |
| 2010/0241472 A1 | 9/2010 | Hernandez |
| 2010/0325131 A1 | 12/2010 | Dumais et al. |
| 2011/0064795 A1 | 3/2011 | Tosi et al. |
| 2011/0179093 A1 | 7/2011 | Pike et al. |
| 2011/0219025 A1 | 9/2011 | Lipson et al. |
| 2011/0282906 A1 | 11/2011 | Wong |
| 2011/0064796 A1 | 12/2011 | Sun et al. |
| 2011/0295879 A1 | 12/2011 | Logis et al. |
| 2012/0011148 A1 | 1/2012 | Rathus et al. |
| 2012/0191705 A1 | 7/2012 | Tong et al. |

FOREIGN PATENT DOCUMENTS

| | | |
|---|---|---|
| WO | WO 01/67297 | 9/2001 |
| WO | WO 2004/059514 | 7/2004 |

OTHER PUBLICATIONS

Agichtein, et al; *Learning User Interaction Models for Predicting Web Search Result Performances*; Aug. 2006; Proceedings of the Twenty-Ninth Annual International ACM SIGIR Conference on Research and Development in Information Retrieval, p. 3-10.

Bar-Llan et al., "Presentation Bias is Significant in Determining User Preference for Search Results—A User Study"; Journal of the American Society for Information Science and Technology, vol. 60, Issue 1 (p. 135-149), Sep. 2008, 15 pages.

Bar-Llan et al.; "Methods for comparing rankings of search engine results"; Computer Networks: The International Journal of Computer and Telecommunications Networking, Jul. 2006, vol. 50, Issue 10, 19 pages.

Boldi, et al.; *The Query-flow Graph: Model and Applications; CKIM '08*, Oct. 26-30, Napa Valley, California, USA, pp. 609-617.

Boyan et al.; *A Machine Learning Architecture for Optimizing Web Search Engines*; Aug. 1996; Internet-based information systems-Workshop Technical Report—American Association for Artificial Intelligence, p. 1-8.

Burke, Robin, Integrating Knowledge-based and Collaborative-filtering Recommender Systems, AAAI Technical Report WS-99-01. Compilation copyright © 1999, AAAI (www.aaai.org), pp. 69-72.

Craswell, et al.; *Random Walks on the Click Graph*; Jul. 2007; SIGIR '07, Amsterdam, the Netherlands, 8 pages.

Cutrell, et al.; *Eye tracking in MSN Search: Investigating snippet length, target position and task types*; 2007; Conference on Human Factors in Computing Systems—Proceedings of the SIGCHI Conference on Human Factors in Computing Systems.

Diligenti, et al., *Users, Queries and Documents: A Unified Representation for Web Mining*, wi-iat, vol. 1, 2009 IEEE/WIC/ACM International Joint Conference on Web Intelligence and Intelligent Agent Technology, 2009, pp. 238-244.

Hofmann, Thomas, *Latent Semantic Models for Collaborative Filtering*, ACM Transactions on Information Systems, vol. 22, No. 1, Jan. 2004, pp. 89-115.

Google News archive, Jul. 8, 2003, Webmasterworld.com, [online] Retrieved from the Internet http://www.webmasterwolrd.com/forum3/15085.htm [retrieved on Nov. 20, 2009] 3 pages.

Grčar, Miha, *User Profiling: Collaborative Filtering*, SIKDD 2004, Oct. 12-15, 2004, Ljubljana, Slovenia, 4 pages.

Joachims, T., Evaluating retrieval performance using clickthrough data. Proceedings of the SIGIR Workshop on Mathematical/Formal Methods in Information Retrieval; Aug. 12-15, 2002; Tampere, Finland, 18 pages.

Joachims; *Optimizing search engines using clickthrough data*; 2002; Proceedings of the ACM SIGKDD International Conference on

(56) References Cited

OTHER PUBLICATIONS

Knowledge Discovery and Data Mining, p. 133-142.
Joachims et al., "Search Engines that Learn from Implicit Feedback"; Aug. 2007, IEEE Computer Society.
Kelly, et al.; *Implicit Feedback for Inferring User Preference: A Bibliography*; SIGIR Forum, vol. 37, No. 2 (2003), pp. 18-28.
Linden, Greg et al., *Amazon.com Recommendations: Item-to-Item Collaborative Filtering*, [online], http://computer.org/internet/, IEEE Internet Computing, Jan.-Feb. 2003, IEEE Computer Society, pp. 76-80.
U.S. Appl. No. 11/556,143, filed Nov. 2, 2006, in Office Action mailed Jan. 25, 2010, 14 pages.
U.S. Appl. No. 11/556,143, filed Nov. 2, 2006, in Office Action mailed Jul. 6, 2010, 20 pages.
U.S. Appl. No. 11/556,143, filed Nov. 2, 2006, in Office Action mailed Apr. 20, 2011, 18 pages.
Nicole, Kristen, Heeii is StumbleUpon Plus Google Suggestions, [online], Retrieved from the Internet http://mashable.com/2007/05/15/heeii/, 11 pages.
Lemire, Daniel, *Scale and Translation Invariant Collaborative Filtering Systems*, Published in Information Retrieval, 8(1), pp. 129-150, 2005.
U.S. Appl. No. 11/685,095, filed Mar. 12, 2007, in Office Action mailed Feb. 8, 2010, 31 pages.
U.S. Appl. No. 11/685,095, filed Mar. 12, 2007, in Office Action mailed Feb. 25, 2009, 21 pages.
U.S. Appl. No. 11/685,095, filed Mar. 12, 2007, in Office Action mailed Sep. 10, 2009, 23 pages.
U.S. Appl. No. 11/685,095, filed Mar. 12, 2007, in Office Action mailed Apr. 13, 2011, 31 pages.
Radlinski, et al., *Query Chains: Learning to Rank from Implicit Feedback*, KDD '05, Aug. 21-24, 2005, Chicago, Illinois, USA, 10 pages.
U.S. Appl. No. 11/556,086 filed Nov. 2, 2006, in Office Action mailed Jun. 23, 2010, 21 pages.
Schwab, et al., *Adaptivity through Unobstrusive Learning*, 2002, 16(3), pp. 5-9.
Stoilova, Lubomira et al., *GiveALink: Mining a Semantic Network of Bookmarks for Web Search and Recommendation*, LinkKDD '05, Aug. 21, 2005, Chicago, IL, USA, 8 pages.
W3C, URIs, URLs and URNs: Classification and Recommendations 1.0, Report from the joint W3C/IETF URI Planning Interest Group, Sep. 21, 2001, 8 pages.
Xiao, et al., *Measuring Similarity of Interests for Clustering Web-Users*, ADC, 2001, pp. 107-114.
Xie et al., *Web User Clustering from Access Log Using Belief Function*, K-CAP '01, Oct. 22-23, 2001, Victoria, British Columbia, Canada, pp. 202-208.
Yu et al., *Selecting Relevant Instances for Efficient and Accurate Collaborative Filtering*, CIKM '01, Nov. 5-10, 2001, Atlanta, Georgia, pp. 239-246.
Zeng et al., *Similarity Measure and Instance Selection for Collaborative Filtering*, WWW '03, May 20-24, 2003, Budapest, Hungary, pp. 652-658.
Zeng, et al., "Learning to Cluster Web Search Results", SIGIR '04, Proceedings of the 27th Annual International ACM SIGIR conference on research and development in information retrieval, 2004.
Soumen Chakrabarti, et al. "Enhanced Topic Distillation using Text, Markup tags, and Hyperlinks" ACM 2001, pp. 208-216, July.
Gabriel Somlo et al., "Using Web Hepler Agent Profiles in Query Generation", ACM, Jul. 2003, pp. 812-818.
Australian Patent Office Non-Final Office Action in AU App. Ser. No. 2004275274, mailed Feb. 3, 2010, 2 pages.
Dan Olsen et al., "Query-by-critique: Spoken Language Access to Large Lists", ACM, Oct. 2002, pp. 131-140.
Nicolas Bruno et al., "Top-K Selection Queries over Relational Databases: Mapping Strategies and Performance Evaluation", ACM, Jun. 2002, pp. 153-187.
Ji-Rong Wen et al., "Query Clustering using User Logs", ACM, Jan. 2002, pp. 59-81.
International Search Report and Written Opinion for Application No. PCT/US2004/029615, dated Jan. 19, 2005, 8 pages.
Hungarian Patent Office, International Search Report and Written Opinion for Application No. 200806756-3, dated Nov. 19, 2010 12 pages.
Authorized Officer Athina Nickitas-Etienne, International Preliminary Report and Written Opinion for Application No. PCT/US2004/029615, mailed Mar. 23, 2006.
Indian Office Action in Indian Application No. 686/KOLNP/2006, mailed Jun. 3, 2008, 2 pages.
Danish Search Report and Written Opinion for Application No. 200601630-7, dated Jun. 21, 2007, 15 pages.
Jones et al., "Pictures of Relevance: A Geometric Analysis of Similarity Measures", Journal of the American Society for Information Science, Nov. 1987, 23 pages.
Kaplan et al., "Adaptive Hypertext Navigation Based on User Goals and Context", User Modeling and User-Adapted Interaction 2, 1993; pp. 193-220, 28 pages.
Joachims, "Evaluating Search Engines Using Clickthrough Data", Cornell University, Department of Computer Science, Draft, Feb. 19, 2002, 13 pages.
Jansen et al., "An Analysis of Web Documents Retrieved and Viewed", School of Information Sciences and Technology, The Pennsylvania State University, the 4th International Conference on Internet Computing, Las Vegas, Nevada, pp. 65-69, Jun. 23-26, 2003, 5 pages.
Soumen Chakrabarti et al., "Enhanced Topic Distillation Using Text, Markup tags, and Hyperlinks," Proceedings of the 24th Annual International ACM SIGIR Conference on Research and Development in Information Retrieval, Sep. 2001, pp. 208-216.
Susan Gauch et al., "A Corpus Analysis Approach for Automatic Query Expansion and its Extension to Multiple Databases," ACM Transactions on Information Systems, Jul. 1999, pp. 250-269.
S. Brin and L. Page, "The Anatomy of a Large-Scale Hypertextual Web Search Engine," Computer Networks and ISDN Systems, vol. 30, pp. 107-117, Apr. 1998.
Liddy et al., "A Natural Language Text Retrieval System With Relevance Feedback," Proceedings of the 16th National Online Meeting, May 1995, pp. 259-261.
"Personalizing Search via Automated Analysis of Interests and Activities," by Teevan et al. IN: SIGIR'05 (2005), 8 pages.

\* cited by examiner

RANKING SEARCH RESULTS BASED ON ANCHORS

BACKGROUND

The present disclosure relates to, among other things, ranking of search results.

Internet search engines typically operate by storing information about many web pages, which they retrieve from the World Wide Web (WWW) using a Web crawler that follows hyperlinks on pages it encounters. The contents of each page are typically analyzed to determine how the page should be indexed (for example, words are extracted from the titles, headings, or special fields called meta tags). Data about web pages are stored in an index database for use in later queries. When a user enters a query into a search engine, the search engine examines its index and provides a listing of best-matching web pages according to its criteria, usually with a short summary containing the document's title and sometimes parts of the text. The usefulness of a search engine depends on the relevance of the result set it gives back. While there may be millions of web pages that include a particular word or phrase, some pages may be more relevant, popular, or authoritative than others. Some search engines employ techniques to rank the results to provide the "best" results first.

SUMMARY

In general, one aspect of the subject matter described in this specification can be embodied in a method for providing input to a document ranking process for ranking a plurality of documents, the document ranking process taking as input a quality of result statistic for an individual document in the plurality of documents, the plurality of documents having been identified in response to a query, the quality of results statistic being for the query and the individual document. The method for providing input to a document ranking process can include, for a first document identified as a search result of a user-submitted query, receiving information regarding an anchor contained within the first document, where the anchor is a portion of the first document that provides a link to a second document. The method for providing input to a document ranking process can further include deriving a quality of result statistic for the second document from at least a portion of first data associated with the first document and the user-submitted query, the first data being indicative of user behavior relative to the first document as a search result for the user-submitted query. The method for providing input to a document ranking process can additionally include providing the first quality of result statistic as the quality of result statistic input to the document ranking process for the second document and the user-submitted query.

These and other embodiments can optionally include one or more of the following features. The second document can be identified as a search result of the user-submitted query. The method for providing input to a document ranking process can include identifying second data as being indicative of user behavior relative to the second document as a search result for the user-submitted query. The method for providing input to a document ranking process can additionally include determining that the quality of result statistic for the second document is to be derived from at least the portion of the first data associated with the first document and the user-submitted query based upon the first data associated with the first document and the identified second data associated with the second document both being further associated with the user-submitted query. The user-submitted query can include a first user-submitted query and the method for providing input to a document ranking process can include identifying the second document as a search result of a second user-submitted query determined to be similar to the first user-submitted query. The method for providing input to a document ranking process can include determining that a first internet domain associated with the first document is different than a second internet domain associated with the second document. The method for providing input to a document ranking process can include determining the anchor is relevant to the user-submitted query. Determining the anchor is relevant to the user-submitted query can include determining that at least a portion of text comprising the anchor matches at least a portion of the user-submitted query.

The method for providing input to a document ranking process can additionally include identifying that third data is associated with the anchor and the user-submitted query, the third data being indicative of user behavior relative to the anchor when the first document is a search result for the user-submitted query. The method for providing input to a document ranking process can further include combining at least a portion of the first data with second data associated with the second document and the user-submitted query, the second data being indicative of user behavior relative to the second document as a search result for the user-submitted query, where the quality of result statistic for the second document is derived from the combined first data and second data. Combining the first data with the second data can include aggregating the first data and the second data. Combining the first data with the second data can include combining a percentage of the first data with the second data. The percentage of the first data can be based on a determined degree of relevance for the anchor relative to the user-submitted query.

Particular embodiments of the invention can be implemented to realize one or more of the following advantages. Query results are improved by promoting documents that serve as primary sources of information for a given input query. Instead of user behavior data being misallocated to secondary sources (e.g., directory-type pages) from which users follow links to primary sources of information, user behavior data is appropriately allocated to documents serving as primary sources. User behavior data is mapped to more realistic user browsing patterns with regard to users following links to web pages beyond the first document selected from query results. Techniques for identifying relevant links contained within a selected document are disclosed which enable the utilization of user behavior data for the selected document for linked documents.

The details of one or more implementations of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
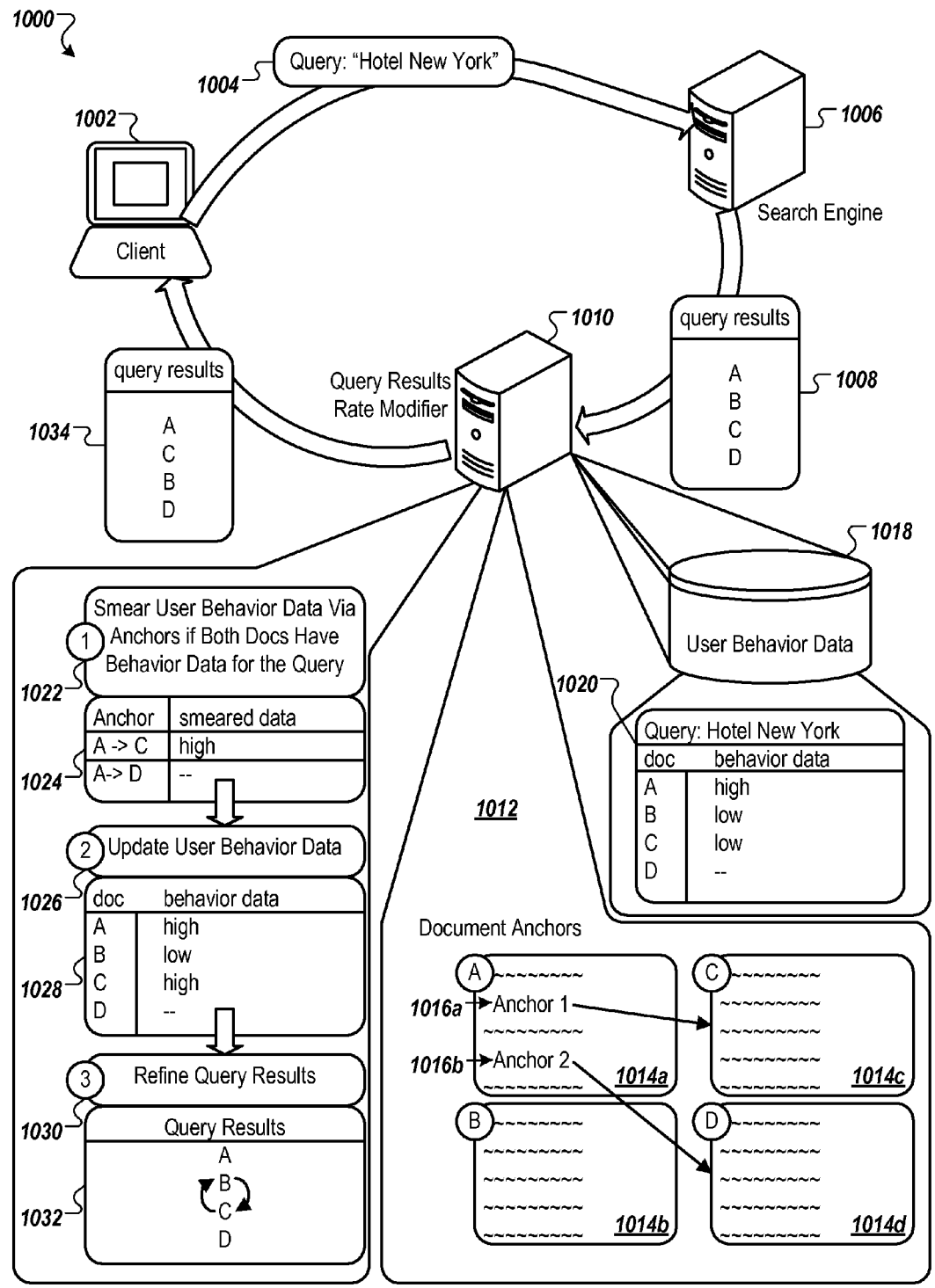
FIG. 1A shows a diagram illustrating improvement of query results from a search engine by identifying relevant document anchors for the purpose of borrowing user behavior data.

FIG. 1A shows a diagram 1000 illustrating improvement of query results from a search engine by identifying relevant document anchors for the purpose of borrowing user behavior data. Described in more detail below, user behavior data can provide an indication as to which documents (e.g., web pages) provided as query results responsive to a particular query users have found to be relevant. A document with favorable user behavior data (e.g., users frequently view the web page and for a "long" period of time) for a particular query can have its rank in a list of query results increased (e.g., the document can be listed closer to the top of the query results). In various implementations, user behavior data is limited to data regarding a users' interactions with query results (e.g., which document the user selects from the query results) and does not extend to a user's subsequent interactions outside of the query results (e.g., documents a user views after viewing the selected document from the query results). However, users frequently select a document provided in the query results only to "browse" away from the selected document by selecting a link (e.g., hyperlink) within the document that takes them to another document. In such instances, user behavior data associated with the selected document should possibly be used for the other document to which a user has browsed.

For instance, many web pages on the Internet serve as secondary sources (e.g., WIKIPEDIA, news feeds (e.g., YAHOO! NEWS), blog postings, TWITTER feeds, etc.)— meaning that they provide a summary or synopsis of another web page that is a primary source of information. Secondary sources will frequently contain a document anchor (e.g., an anchor tag in Hyper Text Markup Language (HTML) such as: <a href="link">anchor text</a>) with a link to the document serving as the primary source. If a user selects a secondary source document from a query result list and browses to a primary source document via a document anchor in the secondary source document, the query results for the particular query can be improved by allocating at least a portion of the user behavior data for the secondary source to the primary source. Such an allocation can more accurately reflect the primary's document relevance to the query. The diagram 1000 illustrates an example of such an improvement to query results by identifying relevant document anchors for the purpose of borrowing user behavior data.

In various implementations, a client 1002 submits an input query 1004 to a search engine 1006 and the search engine 1006 returns results to the client 1002. In the example depicted in the diagram 1000, the client 1002 submits the query 1004 "Hotel New York." The search engine 1006 produces results 1008 that are an ordered list of documents determined to be responsive to the input query 1004, with the most relevant documents being provided at the top of the list. The search engine 1006 determines relevance based, at least in part, on document content. In the depicted example, the results 1008 are an ordered list of documents A-D. Such an ordering can indicate that the document A has been determined to be more relevant to the query "Hotel New York" than the document D. For example, document A can be a web page that provides a list of hotels in New York and document D can be a blog page discussing a music album entitled "Hotel New York."

The diagram 1000 shows an example framework for improving the results 1008 produced by the search engine 1006 (e.g., promoting results that are more relevant and demoting results that are less relevant) through the use of a query results rank modifier 1010 module. In particular, the query results rank modifier 1010 can improve the results 1008 by using anchors associated with or contained within documents for the purpose of utilizing (e.g., sharing, borrowing) user behavior data from one document to another.

The query results rank modifier 1010 can alter the order of results based upon quality of result statistics for documents. A quality of result statistic for a document is derived from user behavior data associated with the document. One example of user behavior data is "click data." Click data refers to how long a user views or "dwells" on a document after clicking on it in the results for a query. For example, a longer time spent dwelling on a document, termed a "long click", can indicate that a user found the document to be relevant for their query. A brief period viewing a document, termed a "short click", can be interpreted as a lack of document relevance. Another type of user behavior data is based on tracking eye movements of users as they view search results. Other types of user behavior data are possible. In various implementations, the click data is a count of each click type (e.g., long, medium, short) for a document listed as a result for particular input query (a query previously submitted to the search engine 1006) and document combination. Click data from a historical query (e.g., a previously received query for which click data has been received) for a given document can be used to create a quality of result statistic for that document. By way of illustration, a quality of result statistic can be a weighted average of the count of long clicks for a given document and query. Other ways of determining a quality of result statistic for a document are possible.

Another example of user behavior data is purchase decision data. Such user behavior data can be based on, for example, products searched for by consumers, products viewed by consumers, details regarding the viewing of products, and products purchased by consumers.

In various implementations and by way of illustration, user behavior data is generated by a process that creates a record for documents that are selected by users in response to a specific query. Each record (herein referred to as a tuple: <document, query, data>) comprises a query submitted by users, a document reference indicating the document selected by users in response to the query, and an aggregation of click data for all users or a subset of all users that selected the document reference in response to the query. In some implementations, extensions of this tuple-based approach to user behavior data are possible. For instance, the user behavior data can be extended to include location-specific (e.g. country, state, etc) or language-specific identifier. With such identifiers included, a country-specific tuple would include the country from where the user query originated from in whereas a language-specific tuple would include the language of the user query.

The query results rank modifier 1010 can refine the results 1008 produced by the search engine 1006 based on quality of result statistics associated with the documents listed in the query results 1008 for the input query 1004. For instance, if the document D is considered very relevant to the query 1004 based on its quality of result statistic (e.g., users frequently click on and view document D for a long period of time when document D is included in the results for the query 1004) and the document C is considered less relevant to the query 1004 based on its quality of result statistic (e.g., users click on document C infrequently when document C is included in the results for the query 1004), the query results rank modifier 1010 can adjust the ordering of the documents in the results 1008 so that document D is listed before document C (indicating document D is more relevant than document C), for example. Adjustments made to the results 1008 by the query results rank modifier 1010 can be based, at least in part, upon a combination of quality of result statistics and data used by the search engine 1006 to produce the results 1008 (e.g., a score quantifying a document's relevance to a given query).

Adjustment of the results 1008 based on quality of result statistics for each document can promote documents that are actually less relevant to the query 1004 and demote documents that are more relevant to the query 1004. Such erroneous promotion and demotion of documents can be based upon a variety of factors, such as the manner in which click data is captured. In various implementations, click data is generated from a user's click on (e.g., with a mouse) or selection of a document listed in a query result. In some implementations, the click data accounts for the time from the user's click to when the user returns to the query results. However, the click data does not account for the actions taken by the user in between the user's click and return, such as a user following links provided by anchors in the selected document to other documents.

For example, assume that the client 1002 has received the results 1008 for the query 1004 "Hotel New York" and that document A contains document anchors that link to other documents (e.g., document A contains a list of links to web pages for specific hotels in New York). If clients routinely select document A and then follow one of the document anchors to another document (e.g., document C), the user behavior data may inaccurately skew in favor of document A—meaning that document A could be promoted in the query results 1008 for the query 1004 even though users found other documents to which document A linked to be more relevant to the query 1004.

The query results rank modifier 1010 can resolve any such inconsistencies in user behavior data allocation by identifying relevant document anchors and utilizing (e.g., sharing, borrowing) user behavior data accordingly. The query results rank modifier 1010 receives information 1012 regarding document anchors for the received query results 1008. In the example depicted, of the documents A-D 1014a-d listed in the query results 1008, only the document A 1014a has document anchors 1016a-b. The document anchor 1016a is depicted as having a link to the document C 1014c and the document anchor 1016b is depicted as having a link to the document D 1014d.

The query results rank modifier 1010 also receives user behavior data for the documents listed in the query results 1008 from a user behavior data repository 1018. A table 1020 provides a simplified example of user behavior data associated with the documents A-D for the query 1004. In the depicted example, "high" indicates that there is a significant amount of favorable user behavior data (e.g., user behavior data indicating relevance) and "low" indicates an insignificant amount of favorable user behavior data. For instance, the document A is depicted as having a "high" amount of user behavior data for the query 1004, meaning that users frequently click on document A and/or view document A for a long period of time when clicked. The documents B and C are shown as having a "low" amount of user behavior data, meaning that users click on these documents less frequently than document A and/or view these documents for a shorter period of time than document A. The document D is depicted as having a negligible amount of favorable user behavior data for the query 1004.

Having received the document anchor information 1012 and user behavior data from the user behavior data repository 1018 for the query results 1008, the query results rank modifier 1010 identifies relevant document anchors to use for sharing data. As depicted at step 1022 as one of several example techniques for identifying relevant document anchors, a relevant document anchor is a document anchor for which both the document containing the anchor and the document to which the anchor links have associated user behavior data for the query 1004. As shown in the table 1024, of the document anchors 1016a-b contained in document A 1014a, the anchor 1016a from document A 1014a to document C 1014c meets this criteria (there is user behavior data associated with both documents A and C) but the anchor 1016b from document A 1014a to document D 1014d does not (there is no user behavior data associated with document D for query 1004). As such, user behavior data from document A is spread from document A to document C. In the depicted example, all of the user behavior data from document A is utilized to document C. However, in various implementations less than all of the user behavior data can be utilized from the document containing the anchor (e.g., document A) to the linked-to document (e.g., document C).

As depicted at step 1026, the query results rank modifier 1010 can update the user behavior data to include the shared data from the step 1022. As shown in table 1028, the user behavior data associated with document C for the query 1004 has increased to "high," but the user behavior data for the other documents A, B, and D has remained the same as in table 1020. The user behavior data associated with document B for the query 1004 did not change because there was not an anchor via which user behavior data could be utilized for document B. The user behavior associated with the document D for the query 1004 did not change because the anchor 1016b was not deemed relevant to the query 1004 (e.g., users had not previously indicated document D was sufficiently relevant to the query 1004 that it would be likely users were browsing from document A to document D via the anchor 1016b in response to the query 1004). The user behavior data associated with the document A did not change (e.g., users browsing away from document A to document C via the anchor 1016a is only estimated—user behavior data for the document A should not be decreased). In various implementations, the user behavior data associated with a document from which user behavior data is utilized (e.g., document A)

is decreased in proportion to an amount of user behavior data utilized for the given query. In such implementations, decreasing user behavior data associated with a document from which user behavior data is utilized (e.g., shared, borrowed, etc.) can be triggered by the existence of user behavior data indicating browsing patterns with regard to the document (e.g., user behavior data showing what, if any, anchors users select when viewing document A in response to the query 1004).

At step 1030, the query results rank modifier 1010 refines the ranking of one or more documents in the query results using the updated user behavior data. Prior to performing this refinement, the user behavior data can be used to create a quality of result statistic for each of the documents, which can in turn be used to refine the query results. As depicted in the example table 1032, utilizing user behavior data from the document A for the document C causes the document C to increase in rank above the document B.

Once the refinement of the search engine query results 1008 is complete, the query results rank modifier 1010 sends refined query results 1034 to the client 1002.

Figure 1B:
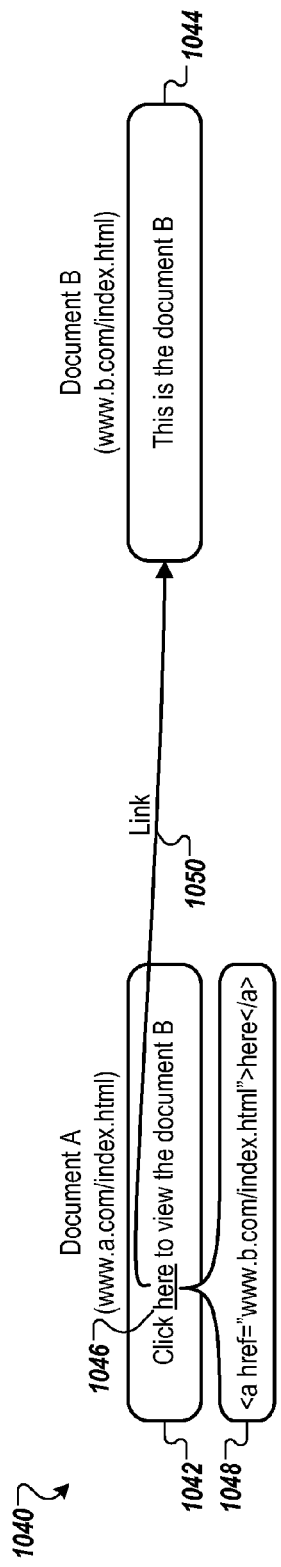
FIG. 1B shows an illustration of an example document anchor via which user behavior data can be shared by a query results rank modifier.

FIG. 1B shows an illustration 1040 of an example document anchor via which user behavior data can be shared by a query results rank modifier. The example anchor depicted can be used by any implementation of a query results rank modifier, such as the query results rank modifier 1010. The example document anchor is depicted as being part of document A 1042. The document A 1042 is shown as being associated with the web address "www.a.com/index.html." The example document anchor is shown as linking to document B 1044, which is associated with the web address "www.b.com/index.html." The anchor is depicted as being a selectable text-based hyperlink 1046 for the word "here." The anchor is implemented in the document A 1042 using an HTML anchor tag 1048, which provides that the anchor links 1055 to the web address for document B 1044.

Figure 1C:
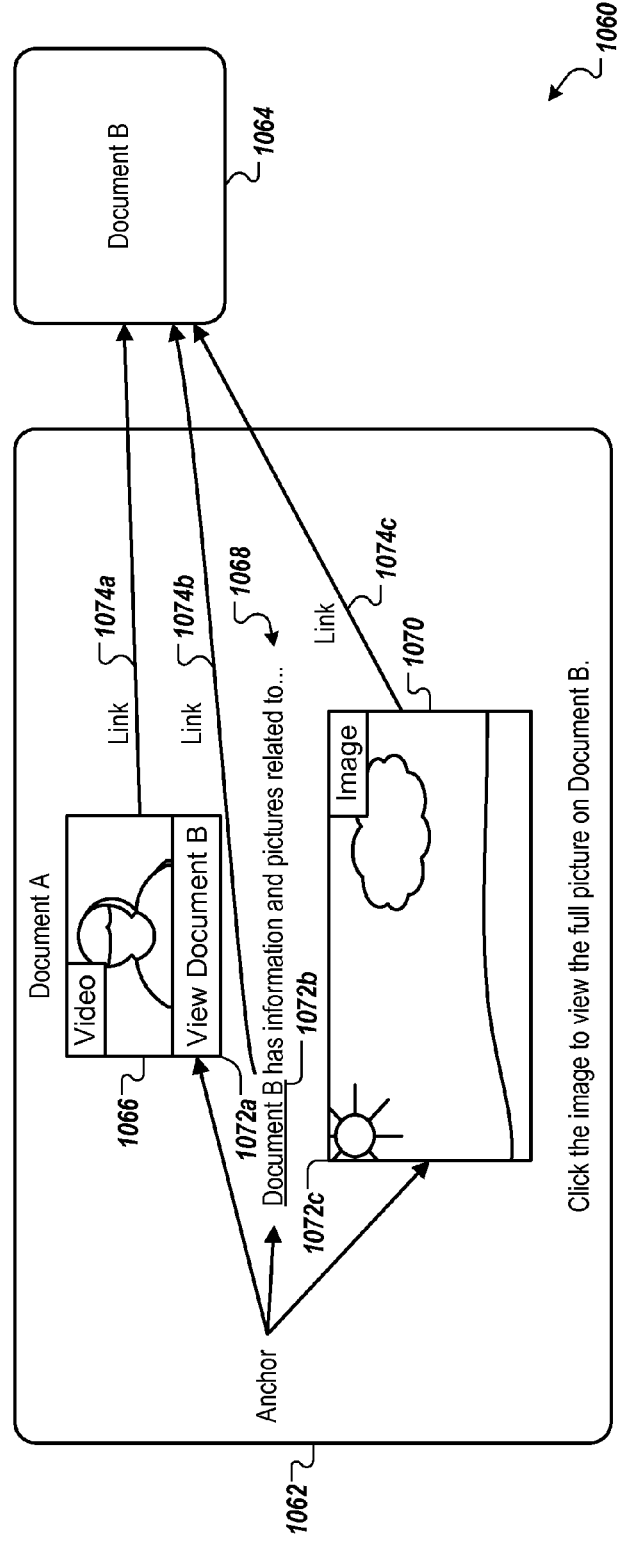
FIG. 1C shows an illustration of example document anchors by which user behavior data can be utilized by a query results rank modifier.

FIG. 1C shows an illustration 1060 of example document anchors by which user behavior data can be utilized by a query results rank modifier (e.g., the query results rank modifier 1010). A query results rank modifier can share user behavior data by the use of anchors from a variety of document-based media (e.g., text, video, image, etc.). The illustration 1060 shows example anchors derived from video, text, and images by which user behavior data can be utilized.

The illustration 1060 shows a document A 1062 containing a variety of document anchors that link to a document B 1064. The document A 1062 contains a video 1066, text 1068, and an image 1070. The document A 1062 contains three anchors 1072*a-c* that are contained in the video 1066, the text 1068, and the image 1070, respectively. Each of the anchors 1072*a-c* provides a link 1074*a-c* to the document B 1064 by which user behavior data can be utilized by a query results rank modifier. The video 1066 is an embedded or streamed digital video (e.g., a FLASH video) that is included in the document A 1062 and contains anchors that link to other documents. For example, the video 1066 can be a video that reviews products and the anchor 1072*a* provides links to a web page for each product that is being reviewed, for instance. The text 1068 is any variety of text capable of containing a document anchor, such as an HTML file, a FLASH file, a Portable Document Format (PDF), etc. The image 1070 is any type of image that is capable of containing an anchor or being associated with an anchor, such as an image associated with an HTML anchor tag, an image associated with an image map, an image contained in a FLASH file and associated with an anchor, etc. Other content types containing anchors are possible.

Figure 1D:
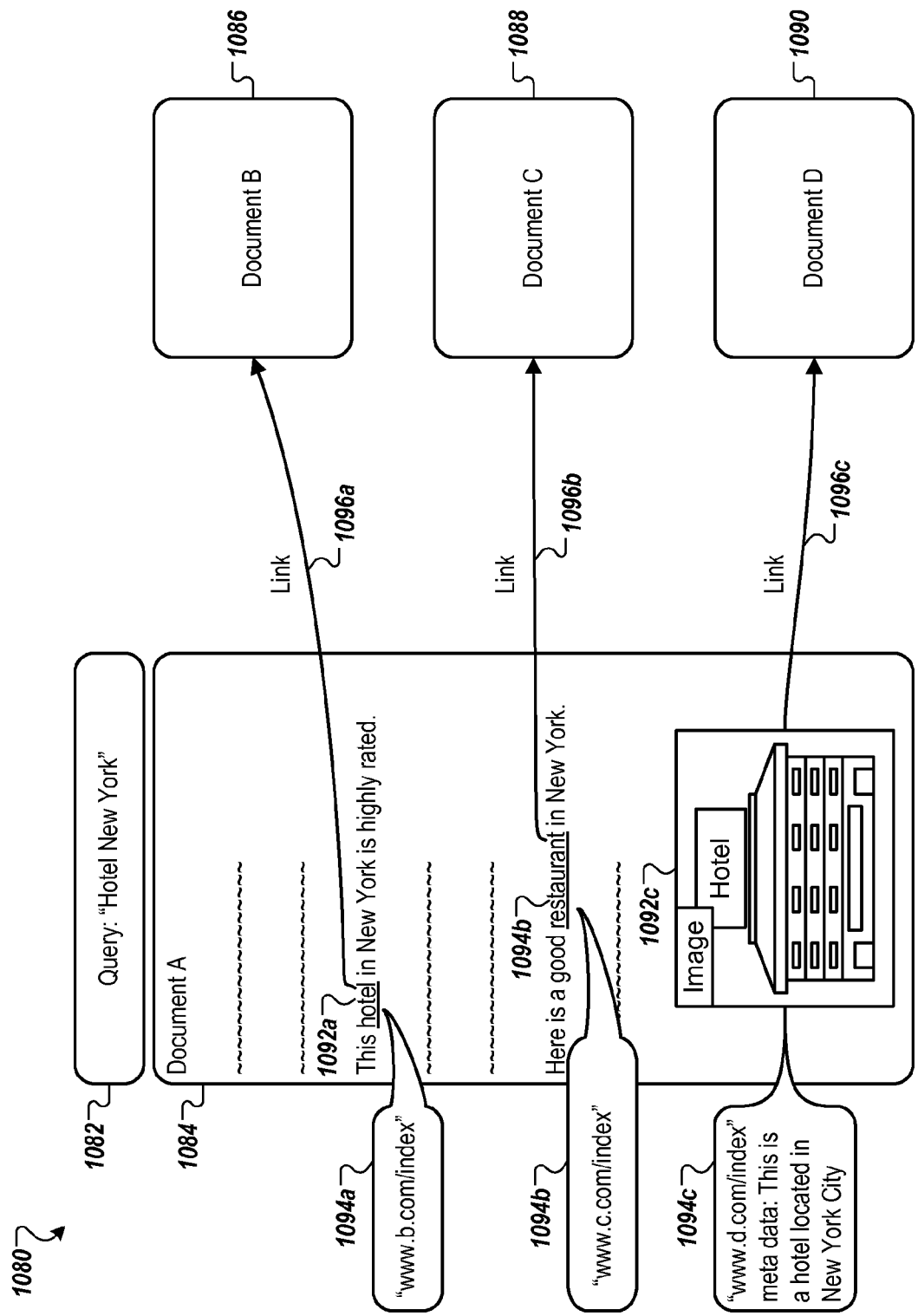
FIG. 1D shows an illustration of example document anchors that can be determined to be relevant to an input query for the purpose of utilizing user behavior data based upon content associated with each of the document anchors.

FIG. 1D shows an illustration 1080 of example document anchors that can be determined to be relevant to an input query 1082 for the purpose of utilizing user behavior data based upon content associated with each of the document anchors. The example document anchors can be analyzed for relevance by any query results rank modifier, such as the query results rank modifier 1010 described above with respect to FIG. 1A.

The input query 1082 is "Hotel New York." Document A 1084 contains three document anchors 1092*a-c* that link to three different documents B-D 1086-1090, respectively. Unlike the example technique for determining document anchor relevance described above with regard to FIG. 1A (e.g., document relevance based upon both the linking and the linked-to document having user behavior data associated with the input query), document anchor relevance is determined in the example illustration 1080 based upon the relevance of content associated with each document anchor. The first anchor 1092*a* provides a link 1096*a* to a web address "www-.b.com/index" 1094*a* for the document B 1086. The first anchor 1092*a* can be determined to be relevant to the query 1082 based upon the first anchor 1092*a* containing and being located nearby text that is related to the query 1082 (e.g., the anchor 1092*a* includes the term "hotel" and is within the same sentence as the phrase "New York"). A query results rank modifier, or an associated system (e.g., a search engine), can determine query to anchor relevance using any variety of content-based relevancy algorithms.

In various implementations, a query results rank modifier determines that an anchor is less or not relevant to a query if the anchor is associated with content that negatively portrays the subject of the query. For instance, were the anchor 1092*a* to be included in the phrase "This hotel is New York is horrible—it should be condemned," the query results rank modifier could determine that the anchor is not relevant and, thus, not utilize user behavior data from document A 1084 for document B 1086. By not utilizing user behavior data when the subject matter of the input query is negatively presented, the query results rank modifier can avoid elevating a document that users are less likely to have selected (e.g., users are more likely to find a positive review to be relevant than a negative review). A variety of techniques can be used to determine whether an anchor negatively portrays the target of the link, such as examining the text of the anchor for negative words like "bad," "terrible," "horrible," etc.

Such a relevancy determination can be limited to certain types of queries where a negative portrayal is less likely to be deemed relevant to an input query by users, such a product or travel related queries. The query results rank modifier can make such a determination using a system that analyzes content associated with an anchor for negative treatment of the input query's subject matter. Other techniques can also be used to determine the relevance of an anchor to a query. For example, an overlap between a query's terms and the anchor text can indicate that the anchor is more relevant to the query (e.g., a query and an anchor both having the term "baseball" can provide an indication the anchor is relevant to the query). In a further example, terms contained in a query that are determined to be important (e.g., nouns, proper names, etc.) and that are not contained in the anchor text can indicate that the anchor is less relevant to the query. Conversely, terms contained in an anchor that are determined to be important and that are not contained in the anchor text can indicate that the anchor is less relevant to the query. In another example, the anchor being part of boilerplate/fixed text for a site can indicate that the anchor is less relevant to a query (e.g., an anchor that provides a link to a legal boilerplate document and that is located at the bottom of every document hosted on a domain can be less relevant to a query than other anchors contained in the documents hosted on the domain).

The second anchor 1092*b* provides a link 1096*b* to a web address "www.c.com/index" 1094*b* for the document C 1088. A query results rank modifier can determine that the anchor 1092*b* is not relevant to the input query 1082 based upon the anchor 1092*b* pertaining to "restaurants" in New York instead of hotels. Such a determination can cause the query results rank modifier to not utilize user behavior data from the document A 1084 for the document C 1088.

The third anchor 1092*c* is an image that provides a link 1096*c* to a web address "www.d.com/index" 1094*c* for the document D 1090. In addition to being associated with the web address 1094*c*, the anchor 1092*c* is associated with metadata providing that the image is of a hotel in New York. Based upon this metadata, a query results rank modifier can determine that the anchor 1092*c* is relevant to the input query 1082. In some implementations, the query results rank modifier image-based content identification to ascertain the relevance of an image or video based anchor (e.g., the query results rank modifier could compare the image for the anchor 1092*c* to a repository of hotel images to identify the hotel). Such a determination can cause the query results rank modifier to utilize user behavior data from the document A 1084 for the document D 1090.

Figure 2:
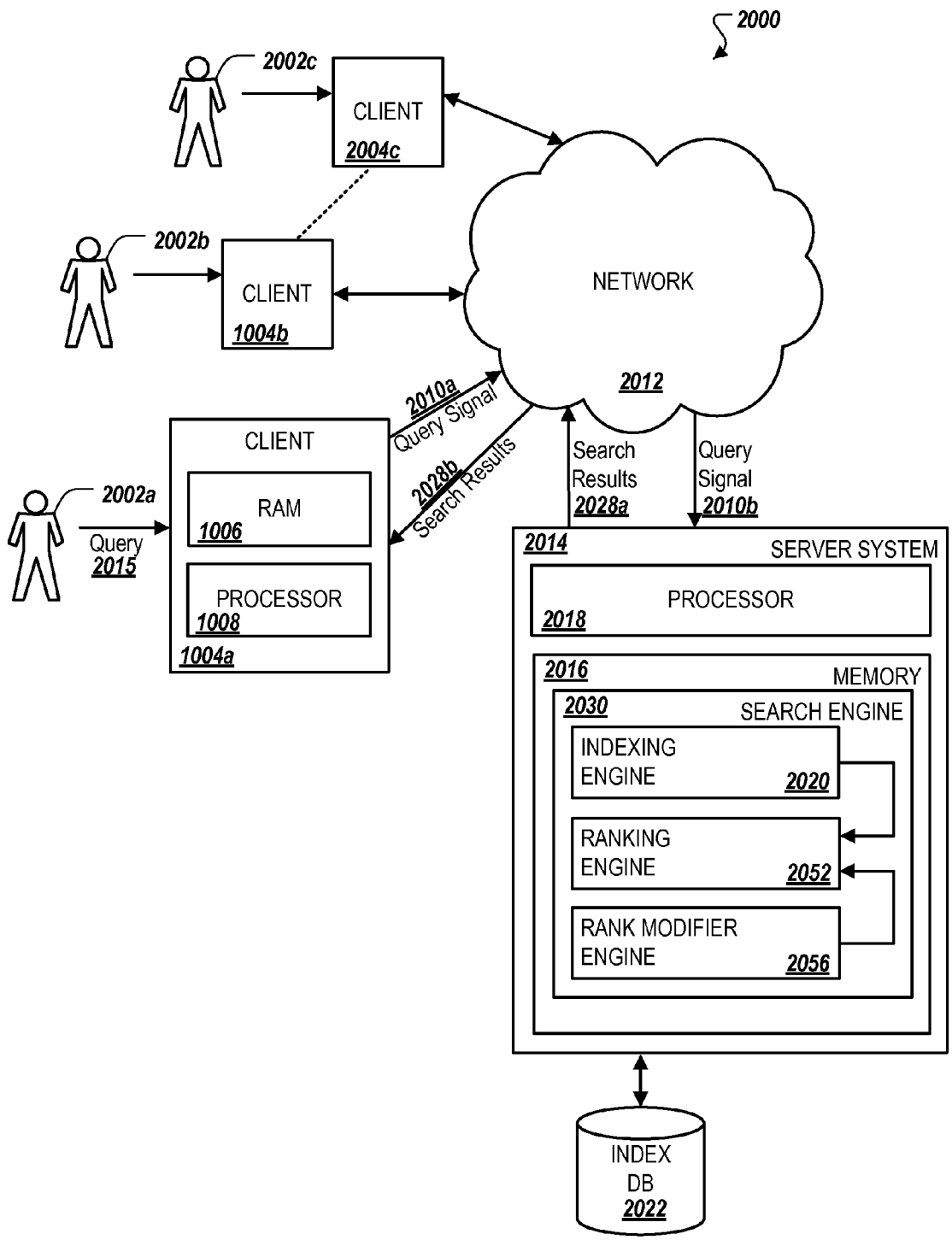
FIG. 2 shows an example information retrieval system in which the relevance of results obtains for submitted search queries can be improved.

FIG. 2 shows an example system 2000 for improving the relevance of results obtained from submitting search queries as can be implemented for the Internet, an intranet, or other client/server environment. The system 2000 is an example of an information retrieval system in which the systems, components and techniques described below can be implemented. Although several components are illustrated, there may be fewer or more components in the system 2000. Moreover, the components can be distributed on one or more computing devices connected by one or more networks or other suitable communication mediums.

A user 2002 (2002*a*, 2002*b*, 2002*c*) can interact with the system 2000 through a client device 2004 (2004*a*, 2004*b*, 2004*c*) or other device. For example, the client device 2004 can be a computer terminal within a local area network (LAN) or wide area network (WAN). In another example, the client device 2004 can be a mobile device (e.g., a mobile phone, a mobile computer, a personal desktop assistant, etc.) that is capable of communicating over a LAN, a WAN, or some other network (e.g., a cellular phone network). The client device 2004 can include a random access memory (RAM) 2006 (or other memory and/or a storage device) and a processor 2008. The processor 2008 is structured to process instructions within the system 2000. In some implementations, the processor 2008 is a single-threaded or multi-threaded processor having one or more processing cores. The processor 2008 is structured to execute instructions stored in the RAM 2006 (or other memory and/or a storage device included with the client device 2004) to display graphical information for a user interface.

A user 2002*a* can connect to the search engine 2030 within a server system 2014 to submit an input query 2015. When the user 2002*a* submits the input query 2015 through an input device attached to a client device 2004*a*, a client-side query signal 2010*a* is sent into a network 2012 and is forwarded to the server system 2014 as a server-side query signal 2010*b*. Server system 2014 can be one or more server devices in one or more locations. A server device 2014 includes a memory device 2016, which can include the search engine 2030 loaded therein. A processor 2018 is structured to process instructions within the device 2014. These instructions can implement one or more components of the search engine 2030. The processor 2018 can be a single-threaded processor or a multi-threaded processor, and can include multiple processing cores. The processor 2018 can process instructions stored in the memory 2016 related to the search engine 2030 and can send information to the client device 2004, through the network 2012, to create a graphical presentation in a user interface of the client device 2004 (e.g., a search results web page displayed in a web browser).

The server-side query signal 2010*b* is received by the search engine 2030. The search engine 2030 uses the information within the input query 2015 (e.g. query terms) to find relevant documents. The search engine 2030 can include an indexing engine 2020 that actively searches a corpus (e.g., web pages on the Internet) to index the documents found in that corpus, and the index information for the documents in the corpus can be stored in an index database 2022. This index database 2022 can be accessed to identify documents related to the user query 2015. Note that, an electronic document (which for brevity will simply be referred to as a document) does not necessarily correspond to a file. A document can be stored in a portion of a file that holds other documents, in a single file dedicated to the document in question, or in multiple coordinated files. Moreover, a document can be stored in a memory without having first been stored in file.

The search engine 2030 can include a ranking engine 2052 to rank the documents related to the input query 2015. The ranking of the documents can be performed using traditional techniques for determining an IR score for indexed documents in view of a given query. The relevance of a particular document with respect to a particular search term or to other provided information may be determined by any appropriate technique. For example, the general level of back-links to a document that contains matches for a search term may be used to infer a document's relevance. In particular, if a document is linked to (e.g., is the target of a hyperlink) by many other relevant documents (e.g., documents that also contain matches for the search terms), it can be inferred that the target document is particularly relevant. This inference can be made because the authors of the pointing documents presumably point, for the most part, to other documents that are relevant to their audience.

If the pointing documents are in turn the targets of links from other relevant documents, they can be considered more relevant, and the first document can be considered particularly relevant because it is the target of relevant (or even highly relevant) documents. Such a technique may be the determinant of a document's relevance or one of multiple determinants. Appropriate techniques can also be taken to identify and eliminate attempts to cast false votes so as to artificially drive up the relevance of a page.

To further improve such traditional document ranking techniques, the ranking engine 2052 can receive an additional signal from a rank modifier engine 2056 to assist in determining an appropriate ranking for the documents. The rank modifier engine 2056 provides one or more measures of relevance for the documents, which can be used by the ranking engine 2052 to improve the search results' ranking provided to the user 2002. The rank modifier engine 2056 can perform one or more of the operations described above and below in this document to generate the one or more measures of relevance.

For instance, the rank modifier engine 2056 can perform the functionality described above with regard to the query results rank modifier 1010.

The search engine 2030 can forward the final, ranked result list within a server-side search results signal 2028*a* through the network 2012. Exiting the network 2012, a client-side search results signal 2028b can be received by the client device 2004a where the results can be stored within the RAM 2006 and/or used by the processor 2008 to display the results on an output device for the user 2002a.

Figure 3:
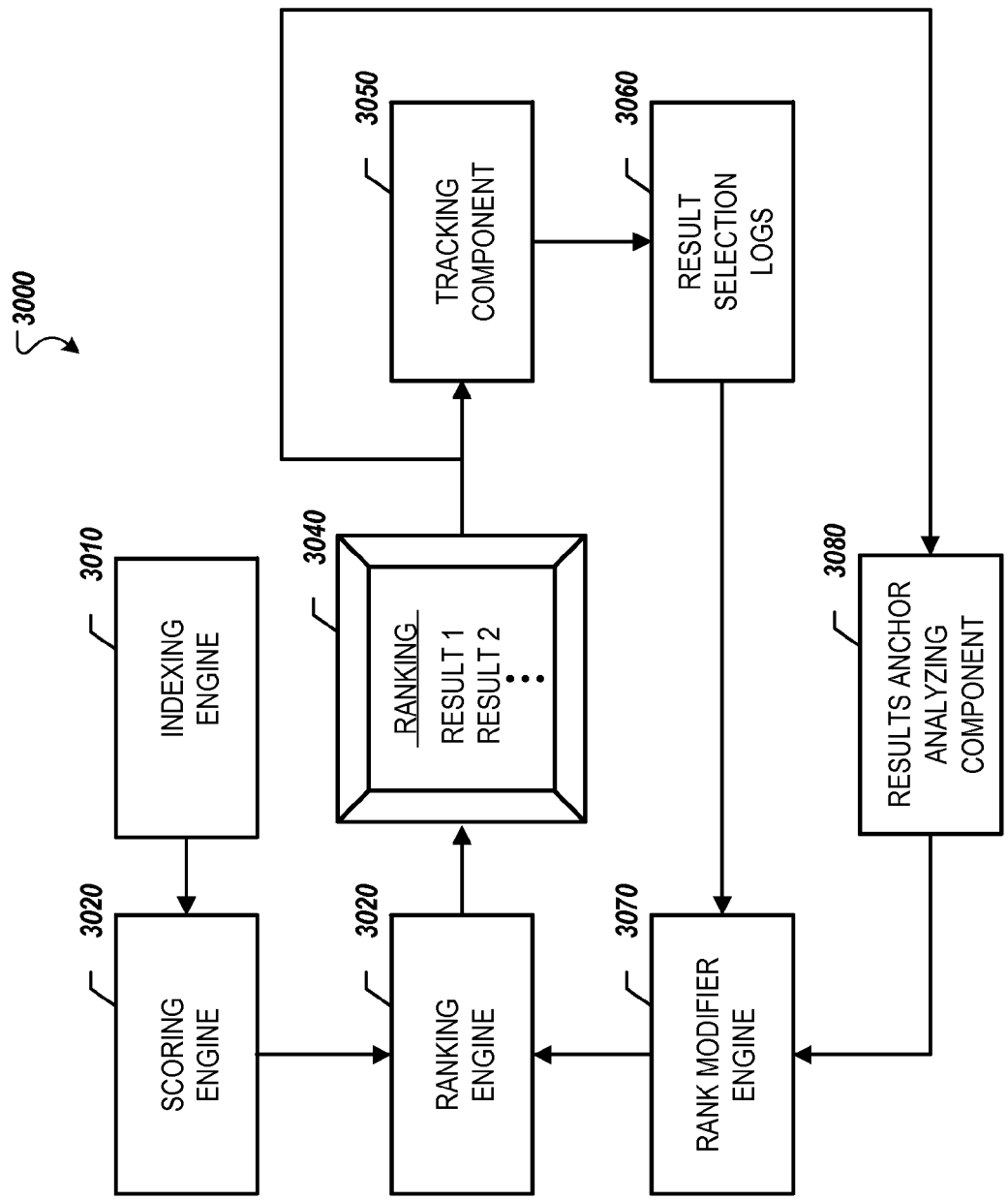
FIG. 3 shows example components of an information retrieval system.

FIG. 3 shows example components of an information retrieval system 3000. These components can include an indexing engine 3010, a scoring engine 3020, a ranking engine 3030, and a rank modifier engine 3070. The indexing engine 3010 can function as described above for the indexing engine 2020. The rank modifier engine 3070 can function as described above with regard to the query results rank modifier 1010. In addition, the scoring engine 3020 can generate scores for document results based on many different features, including content-based features that link a query to document results, and query-independent features that generally indicate the quality of documents results. The content-based features can include aspects of document format, such as query matches to title or anchor text in an HTML page. The query-independent features can include aspects of document cross-referencing. Moreover, the particular functions used by the scoring engine 3020 can be tuned, to adjust the various feature contributions to the final IR score, using automatic or semi-automatic processes.

The ranking engine 3030 can produce a ranking of document results 3040 for display to a user based on IR scores received from the scoring engine 3020 and one or more signals from the rank modifier engine 3070. A tracking component 3050 can be used to record information regarding user behavior such as individual user selections of the results presented in the ranking 3040. For example, the tracking component 3050 can be embedded JavaScript code included in a web page ranking 3040 that identifies user selections (e.g., mouse clicks) of individual document results and also identifies when the user returns to the results page, thus indicating the amount of time the user spent viewing the selected document result. In other implementations, the tracking component 3050 is proxy system through which user selections of the document results are routed, or the tracking component can include pre-installed software at the client. Other implementations are also possible, such as by using a feature of a web browser that allows a tag/directive to be included in a page, which requests the browser to connect back to the server with message(s) regarding link(s) clicked by the user.

The recorded information can be stored in result selection logs 3060. The recorded information can include log entries that indicate, for each user selection, the query (Q), the document (D), the user's dwell time (T) on the document, the language (L) employed by the user, and the country (C) where the user is likely located (e.g., based on the server used to access the IR system). Other information indicative of user behavior can also be recorded, such as user interactions with a presented ranking, including negative information, such as the fact that a document result was presented to a user, but was not clicked, position(s) of click(s) in the user interface, information about the session (e.g., existence and type of previous clicks, and post-click session activity), IR scores of clicked results, IR scores of all results shown before click, the titles and snippets shown to the user before the click, the user's cookie, cookie age, IP (Internet Protocol) address, user agent of the browser, etc.

In various implementations, the time (T), also known as "click data", is measured as the time between the initial click through to the document result until the time the user comes back to the main page and clicks on another document result. In general, an assessment is made about the time (T) regarding whether this time indicates a longer view of the document result or a shorter view of the document result, since longer views are generally indicative of quality or relevance for the clicked through result. This assessment about the time (T) can further be made in conjunction with various weighting techniques.

The information retrieval system 3000 can additionally include a results anchor analyzing component 3080 that can analyze and identify relevant anchors contained in results generated by the ranking 3040. The relevant anchors can be identified by the results anchor analyzing component 3080 for the purpose of the rank modifier engine 3070 utilizing user behavior data. The results anchor analyzing component 3080 can perform techniques similar to those described above with regard to the results rank modifier 1010.

The components shown in FIG. 3 can be combined in various manners and implemented in various system configurations. For example, the scoring engine 3020 and the ranking engine 3030 can be merged into a single ranking engine, such as the ranking engine 2052 of FIG. 2. The rank modifier engine 3070 and the ranking engine 32030 can also be merged, and in general, a ranking engine includes any software component that generates a ranking of document results after a query. Moreover, a ranking engine can be included in a client system in addition to (or rather than) in a server system.

Figure 4:
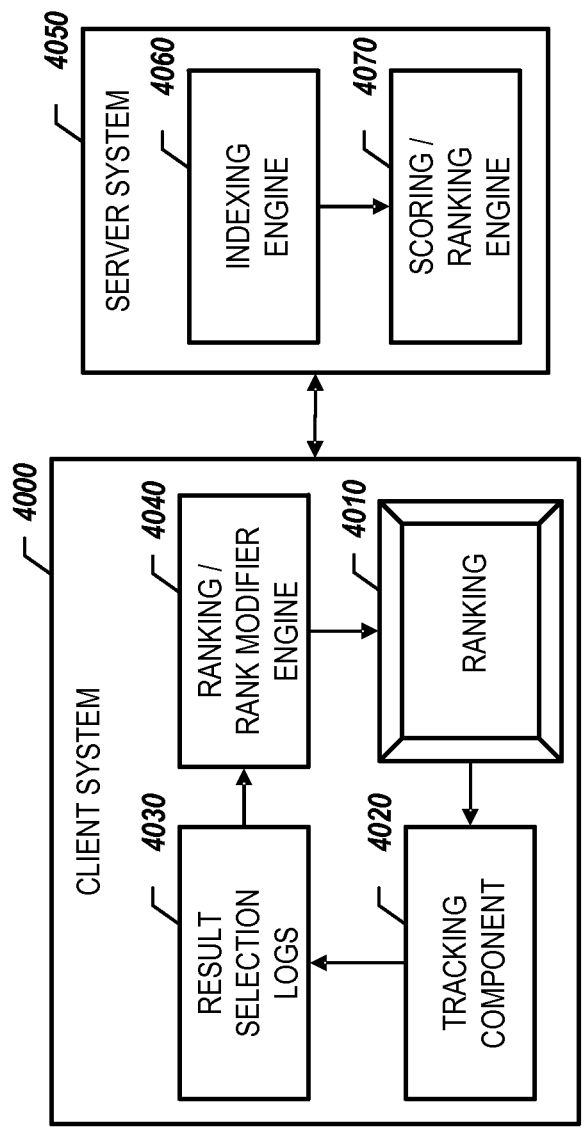
FIG. 4 shows another example information retrieval system.

FIG. 4 shows another example information retrieval system. In this system, a server system 4050 includes an indexing engine 4060 and a scoring/ranking engine 4070. A client system 4000 includes a user interface for presenting a ranking 4010, a tracking component 4020, result selection logs 4030 and a ranking/rank modifier engine 4040. The ranking/rank modifier engine 4040 can perform at least some of the functionality described above with regard to the query results rank modifier 1010. For example, the client system 4000 can include a company's enterprise network and personal computers, in which a browser plug-in incorporates the ranking/rank modifier engine 4040. When an employee in the company initiates a search on the server system 4050, the scoring/ranking engine 4070 can return the search results along with either an initial ranking or the actual IR scores for the results. The browser plug-in can then re-rank the results locally based on tracked page selections for the company-specific user base.

Figure 5:
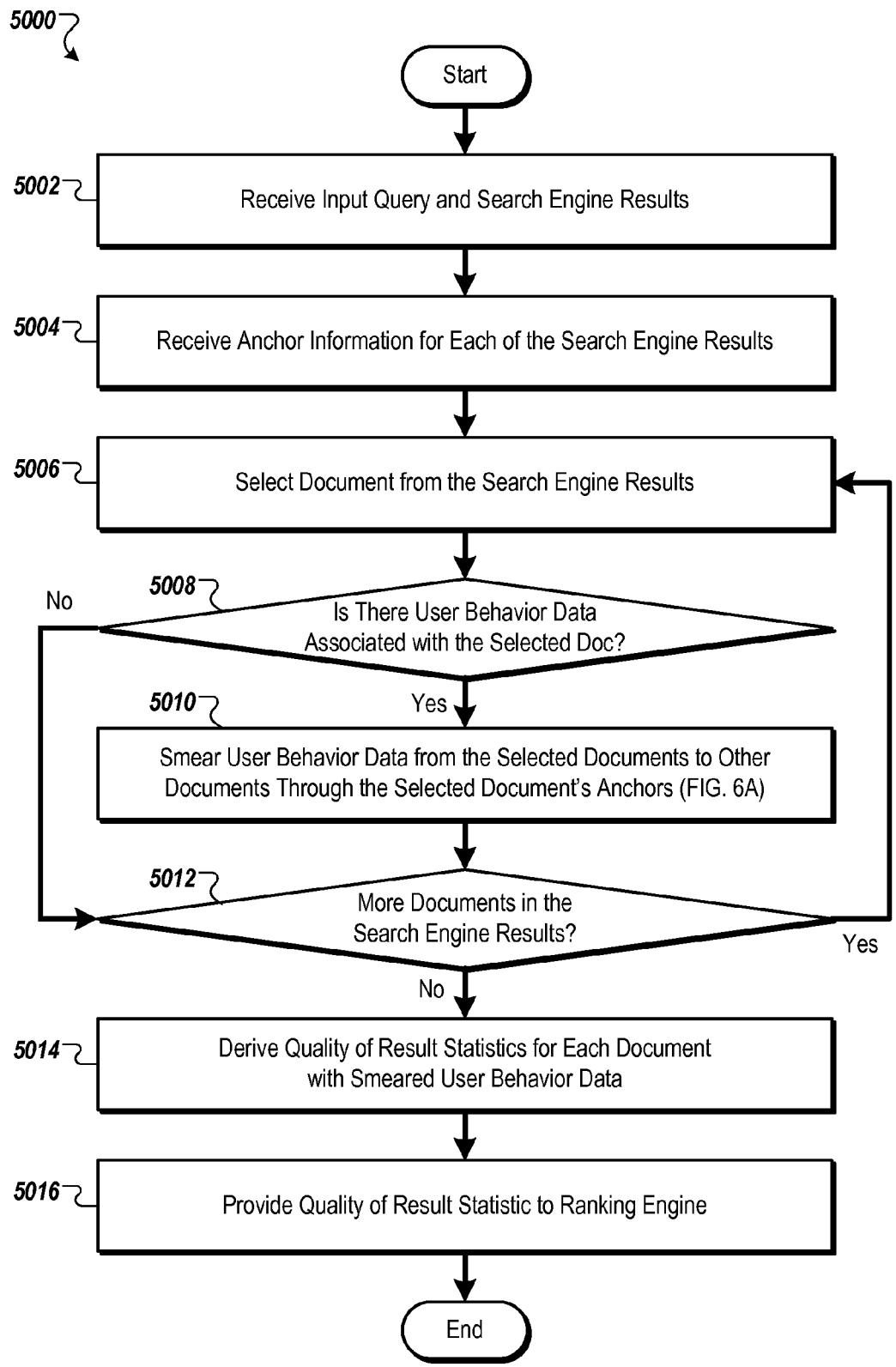
FIG. 5 is a flow chart describing an example technique for identifying and utilizing user behavior data via relevant document anchors in providing improved query results in response to received input query.

FIG. 5 is a flow chart describing an example technique 5000 for identifying and utilizing user behavior data via relevant document anchors in providing improved query results in response to received input query. The technique 5000 can be performed by a variety of systems, for example, by the server system 2014 and its rank modifier engine 2056, as described with reference to FIG. 2, or by the information retrieval system 3000 and its rank modifier engine 3070, as described with reference to FIG. 3.

The technique 5000 begins at step 5002 by receiving an input query and search engine results for the input query. The input query can be submitted over a variety of environments (e.g., Internet, intranet, local machine). For example, the user 2002a can submit the input query 2015 over the network 2012 using client 2004a. The search engine results can be generated by components of a search engine (e.g., indexing engine 2020, scoring engine 3020, etc.) that rank documents according to content (e.g., rank according to an IR score).

Information regarding document anchors is received for each of the documents identified in the search engine results (step 5004). For example, anchor information such as the anchors 1016a-b described above with regard to FIG. 1A are received. A document from the search engine results and for which an anchor is received is selected (step 5006). A determination is made as to whether there is at least a threshold amount user behavior data associated with the selected document (step 5008). Such a determination can be made based upon a variety of user behavior related data, such as a computed quality of result statistic for the selected document, a quantity of raw user behavior data indicative of relevance to the received input query (e.g., a high ratio of long clicks), etc. A threshold against which user behavior data is compared can be based upon a variety of factors, such as empirical analysis of user behavior data for the received query (or for related queries or for all queries), user behavior trends over time with regard to the received query (or for related queries or for all queries), geographic location and/or language of the user submitting the input query in relation to the users from which the user behavior data was generated, etc.

If there is a threshold amount of associated user behavior data associated with the selected document, then user behavior data can be utilized from the selected document for other documents through any relevant document anchors contained in the selected document (step 5010). Document anchor relevance can be determined in a variety of manners, such as those described above with regard to FIGS. 1A and 1D. Additionally, techniques for determining document anchor relevance are described below with regard to FIGS. 6A-B.

After utilizing user behavior data from the selected document for other documents through document anchors or if there is an insufficient amount of user behavior data associated with the selected document, then a determination is made as to whether there are more documents contained in the search engine results to analyze (step 5012). If there are more documents, then steps 5006-5012 are repeated for the remaining documents. If there are no more documents, then a quality of result statistic is derived for each document using the additional utilized user behavior data (step 5014). The derived quality of result statistics are provided to a ranking engine, in addition to the search engine results, to determine a final rank of documents to provide to the user that submitted the received query (step 5016). The technique ends after step 5016.

Figure 6A:
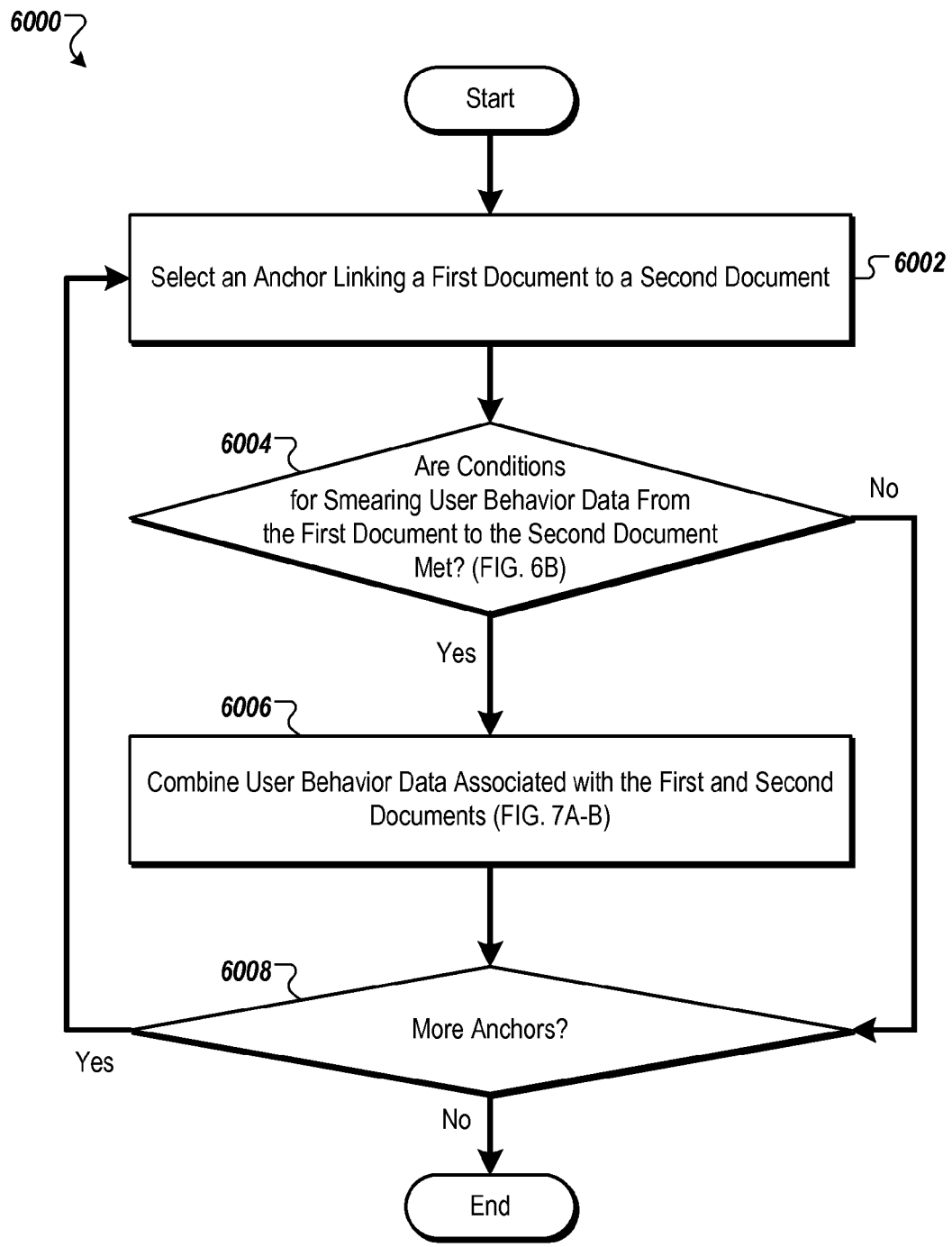
FIG. 6A is a flow chart describing an example technique for identifying and utilizing user behavior data through relevant document anchors.

FIG. 6A is a flow chart describing an example technique 6000 for identifying and utilizing user behavior data through relevant document anchors. The technique 6000 can be performed by a variety of systems, for example, by the server system 2014 and its rank modifier engine 2056, as described with reference to FIG. 2, or by the information retrieval system 3000 and its rank modifier engine 3070, as described with reference to FIG. 3. The technique 6000 can be performed as part of the technique 5000, as described above with regard to FIG. 5. For example, the technique 6000 can be performed at step 5010 of the technique 5000 for each selected document having a threshold amount of user behavior data.

The technique 6000 begins at step 6002 by selecting an anchor contained within a first document that links the first document to a second document. A determination can be made as to whether conditions for utilizing user behavior data from the first document for the second document are met (step 6004). Such a determination can strive to ascertain whether the selected anchor is relevant to a received input query, for which this analysis is being performed. A variety of conditions can be used to determine anchor relevance to a received input query, such as the first document and the second document both having threshold amounts of user behavior data associated with the input query (as described above with regard to FIG. 1A) or the document anchor being associated with content that is relevant to the input query (as described above with regard to FIG. 1D). Additional conditions are possible, as described in further detail below with regard to FIG. 6B.

If the conditions for utilizing user behavior data from the first document for the second document are met, then user behavior data for the second document is adjusted by combining it with utilized user behavior data associated with the first document (step 6006). As described above with regard to FIG. 1A, user behavior data can be utilized from the first document for the second document in whole or in part. Techniques for combining user behavior data are described in further detail below with regard to FIGS. 7A-B.

After the user behavior data has been combined or if the conditions for utilizing user behavior data from the first document for the second document are not met, then a determination can be made as to whether there are more anchors contained within the first document by which user behavior data can be utilized (step 6008). If there are more anchors, then steps 6002-6008 are repeated for each remaining anchor. If there are no more anchors, then the technique 6000 ends.

Figure 6B:
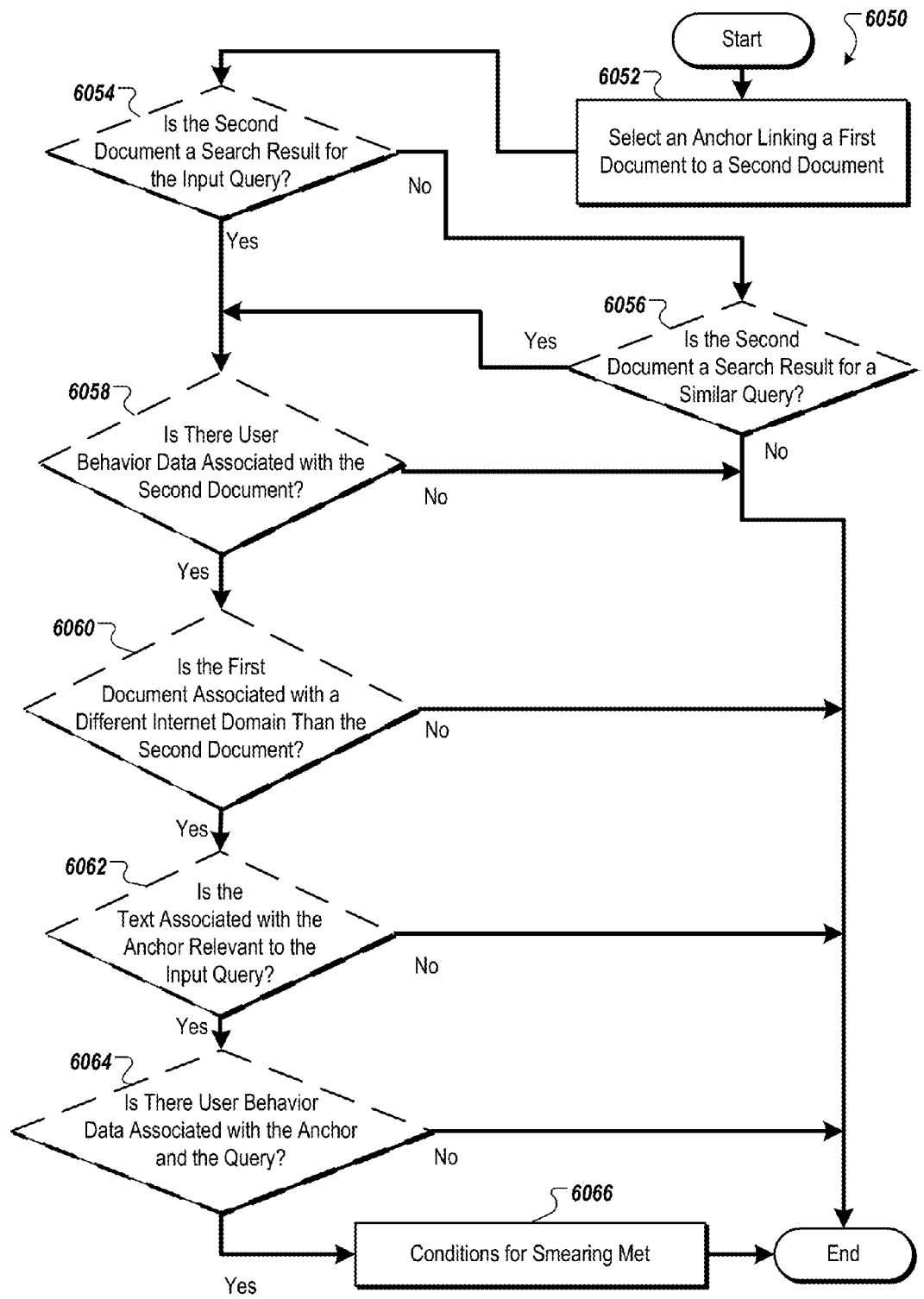
FIG. 6B is a flow chart describing an example technique for identifying relevant document anchors contained within a document for the purpose of utilizing user behavior data.

FIG. 6B is a flow chart describing an example technique 6050 for identifying relevant document anchors contained within a document for the purpose of utilizing user behavior data. The technique 6050 can be performed by a variety of systems, for example, by the server system 2014 and its rank modifier engine 2056, as described with reference to FIG. 2, or by the information retrieval system 3000 and its rank modifier engine 3070, as described with reference to FIG. 3. The technique 6050 can be performed as part of the technique 5000, as described above with regard to FIG. 5, and/or as part of the technique 6000, as described above with regard to FIG. 6A. For example, the technique 6050 can be performed at step 6004 of the technique 6000 for each anchor selected from a document having a threshold amount of user behavior data.

The technique 6050 contains a number of conditions 6054-6064 that are each presented as optional. Any combination of these conditions 6054-6064 can be used. In various implementations, all of the depicted conditions 6054-6064 are used to determine whether an anchor is relevant to an input query. In other implementations, only one of the depicted conditions 6054-6064 is used. The conditions 6054-6064 that are used can vary depending on a variety of factors, such as the type of query received (e.g., product-related query, news-related query, etc.), processing bandwidth for the computing device performing the technique 6050 (e.g., more bandwidth can signal the use of more conditions), etc. The conditions 6054-6064 depicted in the technique 6050 are for illustrative purposes and additional conditions not presented are possible.

The technique 6050 begins at step 6052 by selecting an anchor linking a first document to a second document. A determination is made as to whether the second document is a search result for the received input query (step 6054). For example, if an anchor for a document A that links to a document B is being analyzed, step 6054 can determine whether both document A and document B are provided as search results (e.g., search results 1008) for the input query. In some implementations, such a determination can additionally ascertain whether both documents have received at least a threshold IR score (e.g., both documents have at least a baseline relevance to the input query based upon content alone).

If the second document is not a search result for the input query, a determination can be made as to whether the second document is a search result for a related query (step 6056). For instance, if the input query is "Hotel New York" and the second document is a search result for a second query "Lodging in the Big Apple," the input query and the second query can be deemed related (they are directed to the same subject). A determination of query similarity can be based on a variety of factors, such as similarity of query terms, similarity among the set of search results for both queries, similarity among the set of documents receiving user behavior data for both queries, etc.

If the second document is a search result for the input query or a similar query (or in an implementation where steps 6054-6056 are not used), then a determination is made as to whether there is a threshold amount user behavior data associated with the second document and the input query (or similar query) (step 6058). Both the first document and the second document having user behavior data associated with the input query can indicate that the anchor linking the two documents together is relevant to the input query. The user behavior data analyzed can be raw data (e.g., click data), refined data (e.g., a quality of result statistic), or any combination thereof. An example determination of the step 6058 is described and depicted above with regard to FIG. 1A.

Additional determinations can be made to ascertain whether the presence of user behavior data for the first and second documents provides an indication of anchor relevance. For instance, analysis can be performed regarding a timeframe within which the anchor appeared, user behavior trends for the first and second document regarding the received input query, and how recently updates to the first and second documents were made. As a first example scenario, creation of an anchor for the first document coincided with increased user behavior data for the first document and decreased user behavior data for the second. As a second example scenario, user behavior for the second document had been in steady decline prior to creation of the anchor in the first document, which has not coincided with a boost in user behavior data for the first document. Comparing the two example scenarios, the first example scenario can be determined to provide a greater indication of anchor relevance to the input query based upon the coinciding user behavior changes and the anchor creation.

If the second document has a threshold amount of user behavior data associated with the input query (or in implementations where step 6058 is not used), then a determination can be made as to whether the first document is associated with a different internet domain than the second document (step 6060). In various implementations, utilizing user behavior data from one document for another document can be limited to off-domain anchors (e.g., documents originating from different internet domain addresses). Such off-domain anchors can provide a more reliable indication of relevance to an input query based upon the general notion that they are not self-promoting (e.g., not promoting a page within the same domain).

If the first document and the second document originate from different domains (or in implementations where step 6060 is not performed), a determination can be made as to whether the text associated with the anchor contained in the first document is relevant to the input query (step 6062). An example of such a determination is described above with regard to FIG. 1D. The strictness with which step 6062 is performed can vary depending on a variety of factors, such as empirical data regarding previous input queries and user behavior data utilized by anchors, a type of query submitted (e.g., product query, image query, video query, etc.), etc. In some implementations, the anchor text is analyzed for a match of the query terms. In other implementations, the anchor text as well as surrounding text (e.g., text in the same sentence, paragraph, etc. as the anchor) and metadata is analyzed for a match of the query terms. Text matching algorithms, such as edit-distance, can be used to quantify a similarity between the anchor and the input query, and similarity thresholds can be used to determine whether an anchor sufficiently matches an input query. Synonym substitutions and stemming for terms in the anchor and/or input query can additionally be used to provide a greater breadth of comparison. In various implementations, the degree of similarity between the anchor (and surrounding text) can determine, at least in part, an amount of user behavior data that is utilized from the first document for the second document.

If the text associated with the anchor is relevant to the input query (or in implementations where step 6062 is not used), then a determination can be made as to whether there is user behavior data associated with anchor contained in the first document and the input query (step 6064). Were data regarding user behavior data for anchor to be available (e.g., a server hosting the first document provides user behavior data regarding the anchor contained in the first document), it could be used to directly determine an actual amount of user behavior data that should be utilized from the first document for the second document. For instance, were such provided data to show that ten percent of users that browse to the first document from the input query select the anchor linking to the second document, then ten percent of the user behavior data from the first document could be utilized for the second document.

If the there is user behavior data associated with the anchor and the input query (or in implementations where the step 6064 is not performed), then the conditions for utilizing data from the first document for the second document are met (step 6066). As described previously, the step 6066 can be performed depending on the implementation. In some implementations, all conditions 6054-6064 are used. In other implementations, only one of the conditions 6054-6064 is performed. After the step 6066, the technique 6050 ends.

Figure 7A:
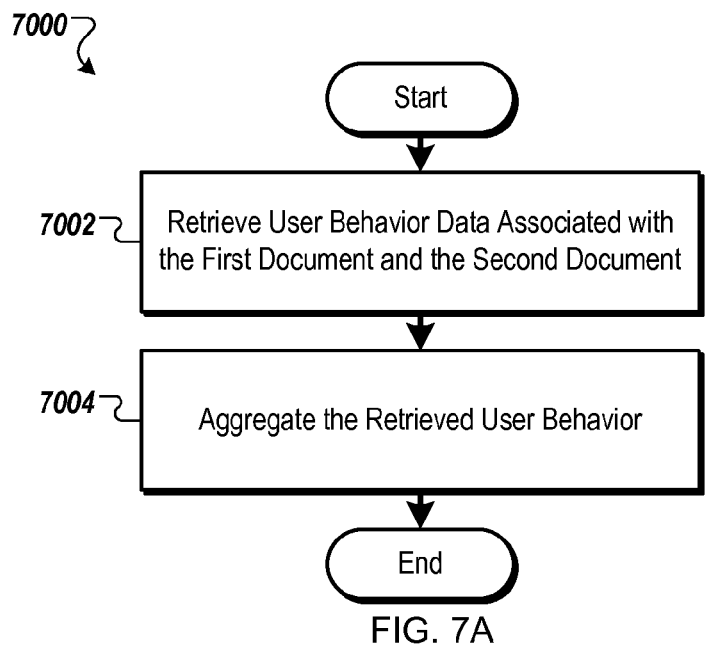
FIGS. 7A-B are flow charts describing example techniques for combining user behavior data for a document with user behavior data that is utilized from another document.
Figure 7B:
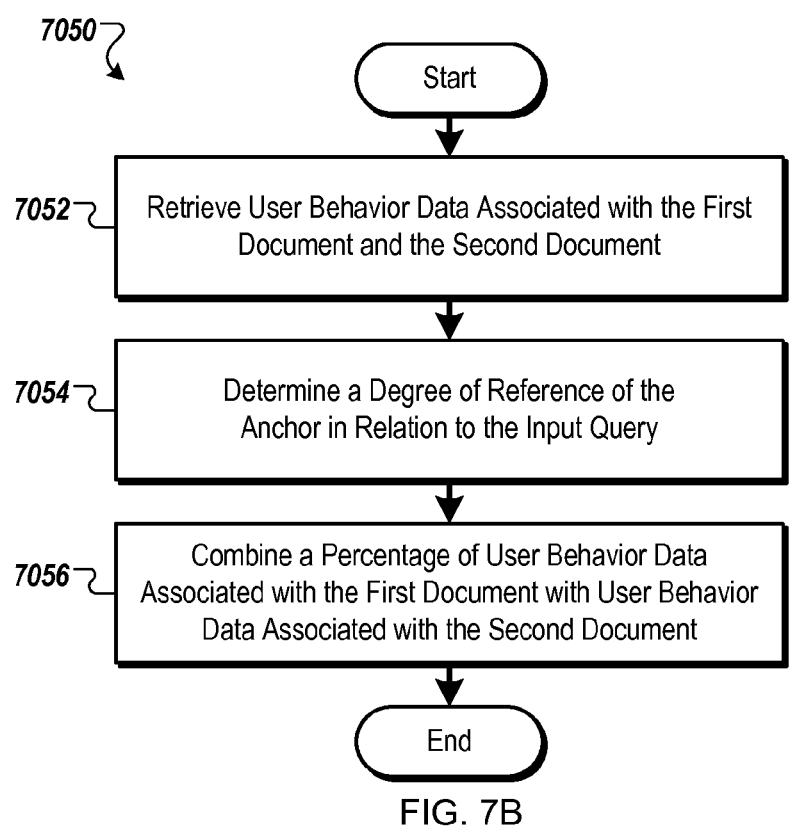

FIGS. 7A-B are flow charts describing example techniques 7000 and 7050, respectively, for combining user behavior data for a document with user behavior data that is utilized from another document. The techniques 7000 and 7050 can be performed by a variety of systems, for example, by the server system 2014 and its rank modifier engine 2056, as described with reference to FIG. 2, or by the information retrieval system 3000 and its rank modifier engine 3070, as described with reference to FIG. 3. The techniques 7000 and 7050 can be performed as part of the technique 5000, as described above with regard to FIG. 5, and/or as part of the technique 6000, as described above with regard to FIG. 6A. For example, the techniques 7000 and 7050 can be performed at step 6006 of the technique 6000 for each anchor selected from a document having a threshold amount of user behavior data.

Referring to FIG. 7A, the technique 7000 begins at step 7002 by retrieving user behavior data associated with a first document (containing an anchor by which user behavior data will be utilized for a second document) and user behavior data for the second document. The anchor linking the first document to the second document has been identified as relevant to an input query in response to which the first document was identified as a search result. The retrieved user behavior data for the first document and the second document is aggregated to form an adjusted level of user behavior data for the second document (step 7004). The aggregated user behavior data can be raw user behavior data (e.g., click data), refined user behavior data (e.g., quality of result statistic), or any combination thereof. After aggregating the user behavior data, the technique 7000 ends.

Referring to FIG. 7B, the technique 7050 begins at step 7052 by retrieving user behavior data associated with a first document (containing an anchor by which user behavior data will be utilized for a second document) and user behavior data for the second document. The anchor linking the first document to the second document has been identified as relevant to an input query in response to which the first document was identified as a search result. A degree of relevance in relation to the input query for the anchor linking the first document to the second document is determined (step 7054). For example, an anchor that contains the exact input query string will have a greater degree of relevance in relation to the input query than an anchor that contains half of the input query terms. Based upon this determined degree of relevance, a percentage of the user behavior data associated with the first document can be combined (e.g., aggregated) with the user behavior data associated with the second document to form an adjusted level of user behavior data for the second document (step 7056). The aggregated user behavior data can be raw user behavior data (e.g., click data), refined user behavior data (e.g., quality of result statistic), or any combination thereof. In various implementations, depending on a degree of relevance for the anchor, the user behavior data associated with the first document can be additionally be reduced. In such implementations, the amount by which the user behavior data for the first document is reduced can range from nothing to the full percentage utilized for the second document, depending on the degree of relevance for the anchor. After combining the user behavior data for the first and second documents, the technique 7050 ends.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
   obtaining, at a computer system, a plurality of search results in response to a query, the plurality of search results including a first reference to a first document and a second reference to a second document;
   determining that the first document referenced in the plurality of search results includes a link to the second document referenced in the plurality of search results;
   in response to determining that the first document referenced in the plurality of search results includes a link to the second document referenced in the plurality of search results, computing a quality of result statistic for the second document based on:
   a first measure of previous user selections of the first document when the first document was referenced by a search result provided for the query, and
   a second measure of previous user selections of the second document when the second document was referenced by a search result provided for the query; and
   providing, by the computer system, the quality of result statistic for the second document as input to a document ranking process, the ranking process configured to rank the plurality of search results for the query.

2. The method of claim 1, further comprising associating at least a portion of the previous user selections of the first document as user behavior data for the second document.

3. The method of claim 1, wherein the quality of result statistic for the second document is further based on a third measure of user selections of the second document when the second document was referenced by a search result provided for a different second query.

4. The method of claim 1, further comprising:
   determining that a first internet domain of a first resource location of the first document is different than a second internet domain of a second resource location of the second document,
   wherein computing a quality of result statistic for the second document based on the first measure of previous user selections of the first document is based on determining that the first internet domain of the first resource location is different than the second internet domain of the second resource location.

5. The method of claim 1, further comprising determining that anchor text associated with the link is relevant to the query,
   wherein computing a quality of result statistic for the second document based on the first measure of previous user selections of the first document is based on determining that the anchor text associated with the link is relevant to the query.

6. The method of claim 5, wherein determining that the anchor text associated with the link is relevant to the query comprises determining that at least a portion of the anchor text matches at least a portion of the query.

7. The method of claim 1, further comprising identifying third data that is associated with the link and the query, the third data indicating, at least, selection of the link in the first document when the first document was previously identified in search results for the query,
   wherein the quality of result statistic is further based on the third data.

8. The method of claim 1, wherein computing a quality of result statistic for the second document based on the first measure of previous user selections of the first document comprises aggregating the first measure of previous user selections of the first document with the second measure of previous user selections of the second document.

9. The method of claim 1, further comprising:
   in response to determining that the first document referenced in the plurality of search results includes a link to the second document referenced in the plurality of search results, reducing the first measure of previous user selections of the first document associated with the first document.

10. The method of claim 1, further comprising:
    determining a degree of relevance between anchor text associated with the link and the query, where the quality of result statistic is further based on the determined degree of relevance between the anchor text associated with the link and the query.

11. A computer program product encoded on one or more non-transitory computer storage media, comprising instructions that when executed by one or more computers cause the one or more computers to perform operations comprising:
    obtaining a plurality of search results in response to a query, the plurality of search results including a first reference to a first document and a second reference to a second document;
    determining that the first document referenced in the plurality of search results includes a link to a second document referenced in the plurality of search results;
    in response to determining that the first document referenced in the plurality of search results includes a link to a second document referenced in the plurality of search results, computing a quality of result statistic for the second document based on:
    a first measure of previous user selections of the first document when the first document was referenced by a search result provided for the query, and
    a second measure of previous user selections of the second document when the second document was referenced by a search result provided for the query; and providing the quality of result statistic for the second document as input to a ranking process, the ranking process configured to rank the plurality of search results for the query.

12. The computer program product of claim 11, wherein the operations further comprise associating at least a portion of the previous user selections of the first document as user behavior data for the second document.

13. The computer program product of claim 11, wherein the operations further comprise determining that anchor text associated with the link is relevant to the query,
   wherein computing the quality of result statistic for the second document based on the first measure of previous user selections of the first document is based on determining that the anchor text associated with the link is relevant to the query.

14. The computer program product of claim 13, wherein determining that the anchor text associated with the link is relevant to the query comprises determining that at least a portion of the anchor text matches at least a portion of the query.

15. The computer program product of claim 11, wherein the operations further comprise:
   in response to determining that the first document referenced in the plurality of search results includes a link to the second document referenced in the plurality of search results, reducing the first measure of previous user selections of the first document associated with the first document.

16. A system for providing input to a document ranking process for ranking a plurality of documents, the system comprising:
   a computer readable medium including a program product; and
   one or more processors configured to execute the program product and perform operations comprising:
      obtaining a plurality of search results in response to a query, the plurality of search results including a first reference to a first document and a second reference to a second document;
      determining that the first document referenced in the plurality of search results includes a link to a second document referenced in the plurality of search results;
      in response to determining that the first document referenced in the plurality of search results includes a link to a second document referenced in the plurality of search results, computing a quality of result statistic for the second document based on:
         a first measure of previous user selections of the first document when the first document was referenced by a search result provided for the query, and
         a second measure of previous user selections of the second document when the second document was referenced by a search result provided for the query; and
      providing the quality of result statistic for the second document as input to a ranking process, the ranking process configured to rank the plurality of search results for the query.

17. The system of claim 16, wherein the operations further comprise associating at least a portion of the previous user selections of the first document as user behavior data for the second document.

18. The system of claim 16, wherein the operations further comprise determining that anchor text associated with the link is relevant to the query,
   wherein computing the quality of result statistic for the second document based on the first measure of previous user selections of the first document is based on determining that the anchor text associated with the link is relevant to the query.

19. The system of claim 18, wherein determining that the anchor text associated with the link is relevant to the query comprises determining that at least a portion of the anchor text matches at least a portion of the query.

20. The system of claim 16, wherein the operations further comprise:
   in response to determining that the first document referenced in the plurality of search results includes a link to the second document referenced in the plurality of search results, reducing the first measure of previous user selections of the first document associated with the first document.

* * * * *